US011914553B2

(12) United States Patent
Borhade

(10) Patent No.: US 11,914,553 B2
(45) Date of Patent: Feb. 27, 2024

(54) METHODS AND SYSTEMS FOR ANALYZING SIMILARITIES ACROSS TABLES AND DATABASES TO PERFORM DE-DUPLICATION IN A STORAGE SERVER

(71) Applicant: T-Mobile Innovations LLC, Overland Park, KS (US)

(72) Inventor: Varsha Borhade, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 62 days.

(21) Appl. No.: 17/496,129

(22) Filed: Oct. 7, 2021

(65) Prior Publication Data
US 2023/0113635 A1 Apr. 13, 2023

(51) Int. Cl.
*G06F 16/174* (2019.01)
*G06F 16/11* (2019.01)
*G06F 16/16* (2019.01)

(52) U.S. Cl.
CPC ........ *G06F 16/1748* (2019.01); *G06F 16/122* (2019.01); *G06F 16/164* (2019.01)

(58) Field of Classification Search
CPC ... G06F 16/1748; G06F 16/164; G06F 16/122
See application file for complete search history.

(56) References Cited

U.S. PATENT DOCUMENTS

| 8,799,235 B2 | 8/2014 | Kacher et al. |
| 8,812,461 B2 | 8/2014 | Li et al. |
| 9,336,246 B2 * | 5/2016 | Gorelik .................. G06F 16/211 |
| 2010/0198730 A1 | 8/2010 | Ahmed et al. |
| 2011/0320865 A1 * | 12/2011 | Jain ........................ G06F 3/0685 714/E11.088 |
| 2013/0086009 A1 | 4/2013 | Li et al. |
| 2013/0124523 A1 | 5/2013 | Rogers et al. |
| 2013/0151490 A1 | 6/2013 | Chaturvedi et al. |
| 2013/0173530 A1 | 7/2013 | Laron |
| 2014/0074801 A1 | 3/2014 | Kacher et al. |
| 2014/0279876 A1 | 9/2014 | Prasanna et al. |
| 2014/0280160 A1 | 9/2014 | Scriffignano et al. |
| 2015/0347691 A1 | 12/2015 | Sethumadhavan et al. |

(Continued)

OTHER PUBLICATIONS

Office Action dated Dec. 22, 2022, U.S. Appl. No. 17/496,115, filed Oct. 7, 2021.

(Continued)

*Primary Examiner* — Hosain T Alam
*Assistant Examiner* — Anthony G Gemignani

(57) ABSTRACT

A system for identifying similarities between tables and databases stored in a storage server comprises the storage server and a management server. The storage server comprises a first database configured to store a plurality of first database tables, and a second database configured to store a plurality of second database tables. The management server is configured to store a storage index indicating metadata describing a plurality of tables stored at the storage server, wherein the metadata indicates a column name of a column in each of the tables, determine a table similarity score, a database similarity score, and access data, and transmit an instruction to the storage server to delete data stored in at least one of the first database or the source table to eliminate redundancies at the storage server.

16 Claims, 11 Drawing Sheets

(56) References Cited

U.S. PATENT DOCUMENTS

2016/0371275 A1* 12/2016 Bernstein .............. G06F 40/169
2021/0342320 A1  11/2021 Ramani et al.
2023/0112918 A1   4/2023 Borhade

OTHER PUBLICATIONS

Borhade, Varsha, "Data Management and De-Duplication at a Storage Server," filed Oct. 7, 2021, U.S. Appl. No. 17/496,115.
Notice of Allowance dated Nov. 22, 2023, U.S. Appl. No. 17/496,115, filed Oct. 7, 2021.

* cited by examiner

METHODS AND SYSTEMS FOR ANALYZING SIMILARITIES ACROSS TABLES AND DATABASES TO PERFORM DE-DUPLICATION IN A STORAGE SERVER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Service providers are increasingly migrating data from localized servers, owned and operated by the service provider itself, to a centralized storage server, such as a cloud-based storage server owned and operated by a third-party cloud hosting company. Such a migration provides several benefits to the service provider, such as substantially decreasing storage overhead and maintenance costs, while providing the ability to access the data in a secure manner from any location. In the cloud-based data storage solutions, the cloud hosting company provides a fixed-size server space in a storage server to service providers, possibly for a fee. The service providers may store data as needed in the fixed-size server space. The service provider still owns the stored data, but the hosting company owns and maintains the required hardware. The data may be stored across one or many storage servers, which may be configured by the cloud hosting company in one or more designated data centers. However, the data migrated to the centralized storage server may contain several redundancies, in which duplicates of data are unnecessarily stored in the storage space allocated to the service provider.

SUMMARY

In an embodiment, a system for identifying similarities between tables and databases stored in a storage server. The system comprises the storage server and a management server. The storage server comprises a first database configured to store a plurality of first database tables, and a second database configured to store a plurality of second database tables, wherein the first database tables comprise a source table and a target table. The management server comprises a non-transitory memory configured to store and a storage index indicating metadata describing a plurality of tables stored at the storage server, wherein the metadata indicates a column name of a column in each of the tables. The management server further comprises a processor configured to execute the instructions, which cause the processor to be configured to determine, by a table similarity scoring application of the management server, a table similarity score between the source table and the target table based on a comparison between metadata describing each column in the source table and metadata describing each column in the target table, determine, by a database similarity scoring application of the management server, a database similarity score between the first database and the second database based on either a comparison between metadata describing each column in the first database and metadata describing each column in the second database, or a plurality of table similarity scores between of each table in the first database and each table in the second database, determine, by a usage application of the management server, access data describing a frequency of accessing data stored in at least one of the first database or the source table, and transmit, using a server-to-storage application programming interface, an instruction to the storage server to delete data stored in at least one of the first database or the source table to eliminate redundancies at the storage server, wherein the data stored in at least one of the first database or the source table is associated with the UE.

In another embodiment, a method performed by a management server for identifying similarities between tables and databases stored in a storage server is disclosed. The storage server comprises a source database and a target database. The method comprises obtaining, by a scanner application of the management server, metadata describing each column in the source table and metadata describing each column in a target table, wherein the metadata indicates a column name of a column in each of a plurality of tables stored at the storage server, determining, by a table similarity scoring application of the management server, a table similarity score between the source table and the target table by comparing metadata describing each column in the source table with metadata describing each column in the target table, determining, by a database similarity scoring application of the management server, a database similarity score between the source database and the target database by determining, by the database similarity scoring application, a quantity of matching columns in the source database, wherein the matching columns in the source database each share common metadata with one or more columns in the target database, and determining, by the database similarity scoring application, a proportion of the quantity of matching columns in the source database relative to a total quantity of columns in the source database, wherein the database similarity score is the proportion, determining, by a usage application of the management server, access data describing a frequency of accessing data stored in at least one of the source database or the source table, and transmitting, to a user equipment, using a server-to-user equipment application programming interface, a message comprising the table similarity score, the database similarity score, and the access data, prompting a user of the UE to delete data stored in at least one of the source database or the source table to eliminate redundancies at the storage server, wherein the data stored in at least one of the source database or the source table is associated with the UEs.

In yet another embodiment, a method performed by a management server for identifying similarities between tables and databases stored in a storage server is disclosed. The storage server comprises a source database and a target database, and the source database comprises a source table and a target table. The method comprises obtaining, by a scanner application of the management server, metadata describing each column in the source table and metadata describing each column in a target table, wherein the metadata indicates a column name of a column in each of a plurality of tables stored at the storage server, determining, by a table similarity scoring application of the management server, a table similarity score between the source table and the target table by comparing metadata describing each column in the source table with metadata describing each column in the target table, determining, by a database similarity scoring application of the management server, a database similarity score between the source database and the target database by determining, by the database similarity scoring application, a plurality of table similarity scores between each table in the source database and each table in the target database, determining, by the database similarity scoring application, a subset of the table similarity scores that are greater than or equal to a pre-defined threshold, determining, by the database similarity scoring application, the database similarity score between the source database and the target database based on an average of the table similarity scores in the subset, a quantity of the table similarity scores in the subset, and a total quantity of tables in the source database, and transmitting, to a user equipment, using a server-to-user equipment application programming interface, a message comprising the table similarity score and the database similarity score, prompting a user of the UE to delete data stored in at least one of the source database or the source table to eliminate redundancies at the storage server, wherein the data stored in at least one of the source database or the source table is associated with the UE.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
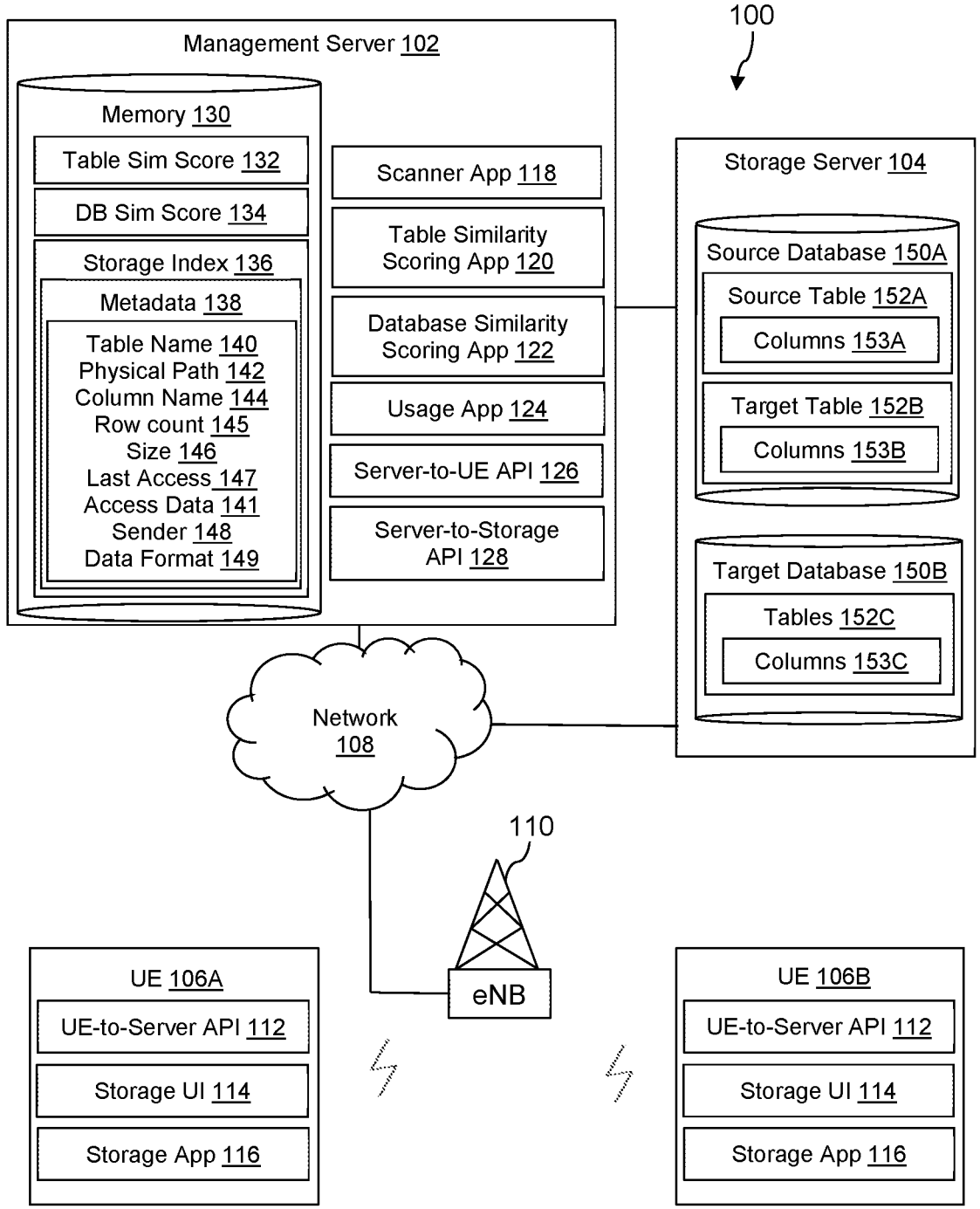
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As mentioned above, service providers are increasingly migrating data from localized servers, owned and operated by the service provider itself, to remote, centralized storage servers, which may be owned and operated by a third-party hosting company. In some cases, the centralized storage servers may be positioned in cloud computing environments and operated by third party cloud hosting companies. Examples of third party cloud hosting companies include, for example, MICROSOFT AZURE, AMAZON WEB SERVICES (AWS), SNOWFLAKE, TERADATA, etc. Each of these cloud hosting companies may include respective applications that provide database management and analytic related services on the data being stored. The centralized storage server may logically store the data for different service providers across one or more different databases. A database within the storage server refers to an organized collection of data that may be stored across one or more servers in the centralized storage server when the central storage server is implemented similar to a data center.

When the service provider migrates data from all the subdivisions into the storage server, the data is merely transferred from the prior data stores to the storage server, and possibly to various databases within the storage server. In addition, this data migration is often performed automatically, without the company or subdivision providing a record or inventory of the actual data being migrated.

In this way, large amounts of redundant data are often migrated, or forwarded through a network, to the centralized storage server. This redundant transmission of data leads to a largely unnecessary waste of computing and networking resources. In addition, the storage servers waste vast amounts of memory space by storing duplicate pieces of the same data at different locations. In certain cases, the data may be personal or private, and the redundant storage of such data poses security risks while wasting resources on redundant security mechanisms.

The embodiments disclosed herein seek to resolve the foregoing problems by providing a management server responsible for analyzing similarities between tables and databases to perform data de-duplication at the storage server. The management server may use a storage index, including metadata describing the tables stored at the storage server, to implement a computing and networking efficient manner of identifying similarities across different tables and databases at the storage server.

In some cases, the storage server may include one or more different databases, some of which may include files and folders. Some of the files may be in the form of a table with multiple rows and columns. For example, the files may be delta files, comma separated value (CSV) files, parquet files, or any other file that is encoded in the form of a table.

First, the management server may determine the tables that should be scanned in the storage server and then generate metadata for each table detected during the scan. The metadata may include, for example, a table name, a physical path to the table within the storage server, a column name for each column in the table, a row count, a size, a timestamp of a last access of the table, access data, a sender, and/or a data format of each column in the table. The management server may store the metadata in the storage index, which provides a detailed overview of the tables stored in the storage server.

After the management server scans the tables to generate the storage index with metadata describing the tables, the management server may begin analyzing the tables and databases to compute table similarity scores and database similarity scores. A table similarity score may be a value representing a similarity between a source table and a target table, within the same database or across different databases. In an embodiment, the management server computes a table similarity score based on a comparison of the metadata of a source table with the metadata of a target table. The database similarity score may be a value representing a similarity between one or more tables in a source database and one or more tables in a target database. In an embodiment, the management server computes the database similarity score based on either a comparison of metadata describing tables in the source database and metadata describing tables in the target database. In another embodiment, the management server computes the database similarity score based on table similarity scores between the tables in the source database and the tables in the target database.

In some cases, the management server may also compute access data related to a frequency of access of one or more tables in the databases stored in the storage server. The access data may be considered in determining whether data should be deleted from the storage server or not. For example, data that is frequently accessed may be retained in the storage server while data that is infrequently access can be deleted from the storage server. The management server may then transmit the table similarity score, database similarity score, and/or the usage data of a table or a database to a UE of a user storing data in the table or database.

The UE may display a notification to the user indicating the table similarity score, database similarity score, and/or the usage data, with a prompt for the user to potentially delete any duplicate data stored at the storage server. For example, when the UE displays a table similarity score, the UE may also display content of the two tables (e.g., similar columns within two different tables), for the user to verify the redundancy of data being stored. The UE may prompt the user to enter a user input or selection, which triggers the UE to transmit an instruction back to the storage server to delete one of the redundant tables or columns. Similarly, when the UE displays a database similarity score, the UE may also display content of the two databases (e.g., similar tables or columns within two different databases), for the user to verify the redundancy of data being stored. The UE may prompt the user to enter a user input or selection, which triggers the UE to transmit an instruction back to the storage server to delete one of the redundant tables or columns. In both of these cases, the usage data for the columns or tables may also be sent with the table and database similarity scores, which can be displayed to the user. The user may further determine whether to delete duplicate data based on the usage data related to the columns or tables where the data is stored.

In some cases, the management server may automatically schedule the deletion, consolidation, or retargeting of duplicate data (e.g., duplicate tables or columns within the tables), for example, when the user does not specify that the duplicate data should be retained. In this case, the management server may schedule the deletion of the duplicate data at a predetermined period of time after prompting the user with the information related to the duplicate data. When the management server has not received an indication that the user wishes to retain the duplicate data, the management server may automatically delete, consolidate, and/or retarget the duplicate data from the storage server.

In this way, the embodiments disclosed herein analyze column similarities, table similarities, and database similarities to identify redundant data stored across databases. This also provides a more granular insight into table similarities, when, for example, two or more tables have some similar columns of data, but not all. The embodiments disclosed herein ensure that only matching columns of data are identified as redundant, not the entire table, thereby ensuring a more accurate and fine-tuned approach to data de-duplication.

In an embodiment, the management server may automatically consolidate data at the storage server to prevent redundancies and, in some cases, group relevant data together. For example, when data is being migrated from the local data stores to the centralized storage server in a cloud-based environment, the management server may scan the data to determine duplicate columns within different tables, tables, or tables across different databases. In this case, the management server may calculate table and database similarity scores and automatically delete certain columns or tables to perform de-duplication of data, for example, based on the access data associated with the to be deleted columns or tables. In another embodiment, the management server may periodically scan the data at the storage server to calculate table and database similarity scores. The management server may then automatically delete certain columns or tables to perform de-duplication of data, for example, based on the access data associated with the to be deleted columns or tables. In some embodiments, the management server may also determine that certain columns of data or tables are frequently accessed together or by certain entities, and trigger these columns and tables to be grouped together. As should be appreciated, these operations may be performed in local data stores and cloud-based data stores.

Therefore, the embodiments disclosed herein clearly seek to conserve storage resources by reducing the storage of duplicate data. In addition, determining similarities across tables and databases by using metadata, instead of the actual stored data, far more computationally efficient. Lastly, reducing the redundancies in the storage of personal and private data saves computing resources that would otherwise be used to maintain security of the data.

Turning now to FIG. 1, a system 100 is described. The system 100 comprises a management server 102, a storage server 104, one or more user equipment (UEs) 106A-B, a network 108, and a cell site 110. The cell site 110 may provide the UEs 106A-B a wireless communication link to the network 108, management server 102, and/or storage server 104 according to a 5G, a long term evolution (LTE), a code division multiple access (CDMA), or a global system for mobile communications (GSM) wireless telecommunication protocol. In this way, the UEs 106A-B may be communicatively coupled to the network 108, management server 102, and/or storage server 104 via the cell site 110.

The UEs 106A-B each may be a cell phone, a mobile phone, a smart phone, a personal digital assistant (PDA), an Internet of things (IoT) device, a wearable computer, a headset computer, a laptop computer, a tablet computer, or a notebook computer. In an embodiment, each of the UEs 106A-B may be owned and operated by a user of a separate subdivision or group within a single service providing company. For example, UE 106A may be part of the billing subdivision and UE 106B may be part of the customer care subdivision. Each of the UEs 106A-B may include a UE-to-server application programming interface (API) 112, a storage UI 114, and a storage application 116. The UE-to-server API 112 may be an interface implemented using a set of functions that support establishment, maintenance, and communication via a wireless connection between each of the UEs 106A-B and either the management server 102 and/or the storage server 104, for example, using the cell site 110. The storage application 116 may be an application by which the user can access information regarding the data stored at the storage server 104. The storage application 116 may also generate prompts for the user based on indications received from the management server 102. The storage UI 114 may be a user interface, managed by the storage application 116, that provides a visual representation of the data stored at the storage server 104. The storage UI 114 may also display the prompts generated by the storage application 116. As should be appreciated, the UEs 106A-B may include other APIs, applications, UIs, and data not otherwise shown in FIG. 1. While only two UEs 106A-B are shown in FIG. 1, it should be appreciated that the system 100 may include any number of UEs.

The network 108 may be one or more private networks, one or more public networks, or a combination thereof. In an embodiment, the management server 102 and the storage server 104 may be part of the network 108, but are illustrated separately in FIG. 1 to further clarify the present disclosure. In an embodiment, the network 108 may include a cloud computing environment provided by a host, and the cloud computing environment includes the management server 102 and the storage server 104. In this embodiment, the service provider associated with UEs 106A-B may reserve cloud computing resources to implement the components within the management server 102 and the storage server 104 on behalf of the service provider. The service providers may use the resources for the storage of data in the storage server 104, and perform operations at the storage server 104 using the management server 102.

The storage server 104 may be implemented as a computer system, which is described further herein. In an embodiment, the storage server 104 provides access to one or more data stores that store customer data owned by various customers, such as the service provider associated with UEs 106A-B. The data store may include one or more hardware devices, such as, for example, non-transitory memories, hard drives, solid state memories, or any other type of memory capable of storing large amounts of data. In this case, the data store includes primarily hardware with data storage capabilities, but may also include processing servers as well. For example, the data store may be implemented as a data center, with a group of distributed memories used for remote storage, processing, and distribution of large amounts of data.

In an embodiment, the storage server 104 is part of the data store such that a processing server (e.g., processor) in the data store implements the functions of the storage server 104 described herein. In another embodiment, the storage server 104 and the data store are separate and distinct entities, in which the storage server 104 and the data store are coupled together in a wireless or wired manner. In this embodiment, the storage server 104 may communicate with the data store to implement the functions of the storage server 104 described herein. The term "storage server 104" as used herein should be understood to refer to both the storage server 104 (e.g., the server providing access to the customer data) and the data stores storing customer data.

As shown in FIG. 1, the storage server 104 includes one or more storage databases 150A-B. As described above, a database 150A-B refers to an organized collection of data that may be stored across one or more of the servers in the storage server 104, and a single hosting company or application may operate a single database 150A-B. In some cases, the different databases may be logical separations of data, the different databases may be physical separations of data (e.g., different databases are located at different servers), or the different databases may be operated by different hosting companies or applications (e.g., MICROSOFT AZURE, AMAZON WEB SERVICES (AWS), SNOWFLAKE, TERADATA, etc.). For example, different databases 150A-B might store data on behalf of different subdivisions of the service providing company. For example, the database 150A may be associated with the billing subdivision, and the storage database 150B may be associated with the customer care subdivision. While FIG. 1 shows the databases 150A-B within the storage server 104, it should be appreciated that database 150A and 150B may be stored on different servers within the storage server 104, or in different storage servers 104 located separate from one another.

In FIG. 1, the storage server 104 includes a source database 150A and a target database 150B. While only two databases 150A-B are shown in FIG. 1, it should be appreciated that the storage server 104 may include any number of databases.

The source database 150 includes a source table 152A and a target table 152B. The target database 150B includes tables 1502. Each of the tables 152A-C include multiple rows and columns 153A-C of data used to conduct and manage business at the service provider. The tables 152A-C may include files that are compressed or otherwise formatted as a table. The files may be delta lake files (hereinafter referred to as "delta files"), CSV files, parquet files, or any other file that is encoded in the form of a table. Delta files are filed encoded according to Delta Lake, which is an open source project that enables building a Lakehouse architecture on top of data lakes. Delta files include a proprietary format used in various cloud data platforms, such as, for example, DATABRICKS. Parquet files have an open source file format available to any project in a HADOOP ecosystem supported by APACHE. CSV files are comma separated variable files. While the source database 150A in FIG. 1 only includes a source table 152A and a target table 152B, it should be appreciated that each of the databases 150A-B may include any number of tables 152A-C. Similarly, each of the tables 152A-C may include any number of columns 153A-C.

The management server 102 may also be implemented as a computer system, which again is described further herein. The management server 102 may include a non-transitory memory 130, storing the table similarity score 132 (shown as the "table sim score 132" in FIG. 1), the database similarity score 134 (shown as the "DB sim score 134" in FIG. 1), and the storage index 136. The table similarity score 132 may be a value representing a similarity between a source table 152A and a target table 152B, within the same database 150A or across different databases 150A-B. Details describing methods of determining the table similarity score 132 are further described below. The database similarity score 134 may be a value representing a similarity between one or more tables 152A-B in a source database 150 and one or more tables 152C in a target database 150B. Details describing methods of determining the database similarity score 134 are further described below.

The storage index 136 may store the metadata 138 describing the tables 152A-B. In an embodiment, the metadata 138 may include, for example, a table name 140, a physical path 142 to the table 152A-C within the storage server 104, a column name 144 for each column in the tables 152A-C, a row count 145, a size 146, a timestamp indicating a last access 147 of the table 152A-C, access data 141, and/or a data format 149 of the data. The table name 140 may indicate a name of the table 152A-C. A physical path 142 may indicate a physical path or location of the table 152A-C in the storage server 104. The column name 144 may indicate a name of a column 153A-C in the tables 152A-C. The row count 145 may indicate a quantity of rows in the table 152A-C. The size 146 may indicate an actual size (in bits, megabits, etc.) of the table 152A-C, or a quantity of rows and columns 153A-C in the table 152A-C. The access data 141 may indicate a frequency of access of a table 152A-C or a column 153A-C. The timestamp of last access 147 may indicate a time at which the table 152A-C was last accessed. The data format 149 may indicate a format (e.g., integers, alphanumeric, string, etc.) of the data stored in a column 153A-C or table 152A-C. In some cases, the metadata 138 may include a sender 148 of the table 152A-C or a column 153 of the table 152A-C when the table 152A-C or column 153 was newly added.

The management server 102 may execute a scanner application 118, a table similarity scoring application 120, a database similarity scoring application 122, a usage application 124, a server-to-UE API 126, and a server-to-storage API 128. The scanner application 118 may scan (e.g., search through, browse, or inspect) the tables 152A-C to obtain the metadata 138. In some embodiments, the scanner application 118 may scan the tables 152A-C periodically according to a pre-defined schedule, or the scanner application 118 may scan the tables 152A-C each time a table 152A-C is accessed (e.g., read and/or written to).

In an embodiment, the table similarity scoring application 120 may determine the table similarity score 132 using the metadata 138 in the storage index 136, as will be further described below. In an embodiment, the database similarity scoring application 122 may determine the database similarity score 134 using the metadata 138 in the storage index 136, as will be further described below. In an embodiment, the usage application 124 may obtain, or determine, the access data 147 indicating the frequency of access of the tables 152A-C or the column 153A-C by maintaining a count indicating the frequency of access of a table 152A-C or a column 153A-C, within a predefined time period.

The server-to-UE API 126 may be an interface implemented using a set of functions that support establishment, maintenance, and communication via a wireless connection between the management server 102 and each of the UEs 106A-B, for example, using the cell site 110. The server-to-storage API 128 may be an interface implemented using a set of functions that support establishment, maintenance, and communication via a connection between the management server 102 and the storage server 104, for example, using the cell site 110, the network 108, or a wired link. As should be appreciated, the management server 102 may include other applications, data, and APIs not otherwise shown in FIG. 1.

As should be appreciated, the system 100 may include other components not shown in FIG. 1. The operations performed by the management server 102, storage server 104, and UEs 106A-B to analyze similarities across tables 152A-C and databases 150A-B to perform de-duplication at the storage server 104 will be further described below with reference to FIGS. 2, 3, 4, 5, and 6. In some embodiments, the management server 102, storage server 104, and UEs 106A-B operate similar to those described in U.S. patent application Ser. No. 17/496,115, filed on Oct. 7, 2021, entitled "Data Management and De-duplication at a Storage Server," by Varsha Borhade, which is hereby incorporated by reference in its entirety.

Figure 2:
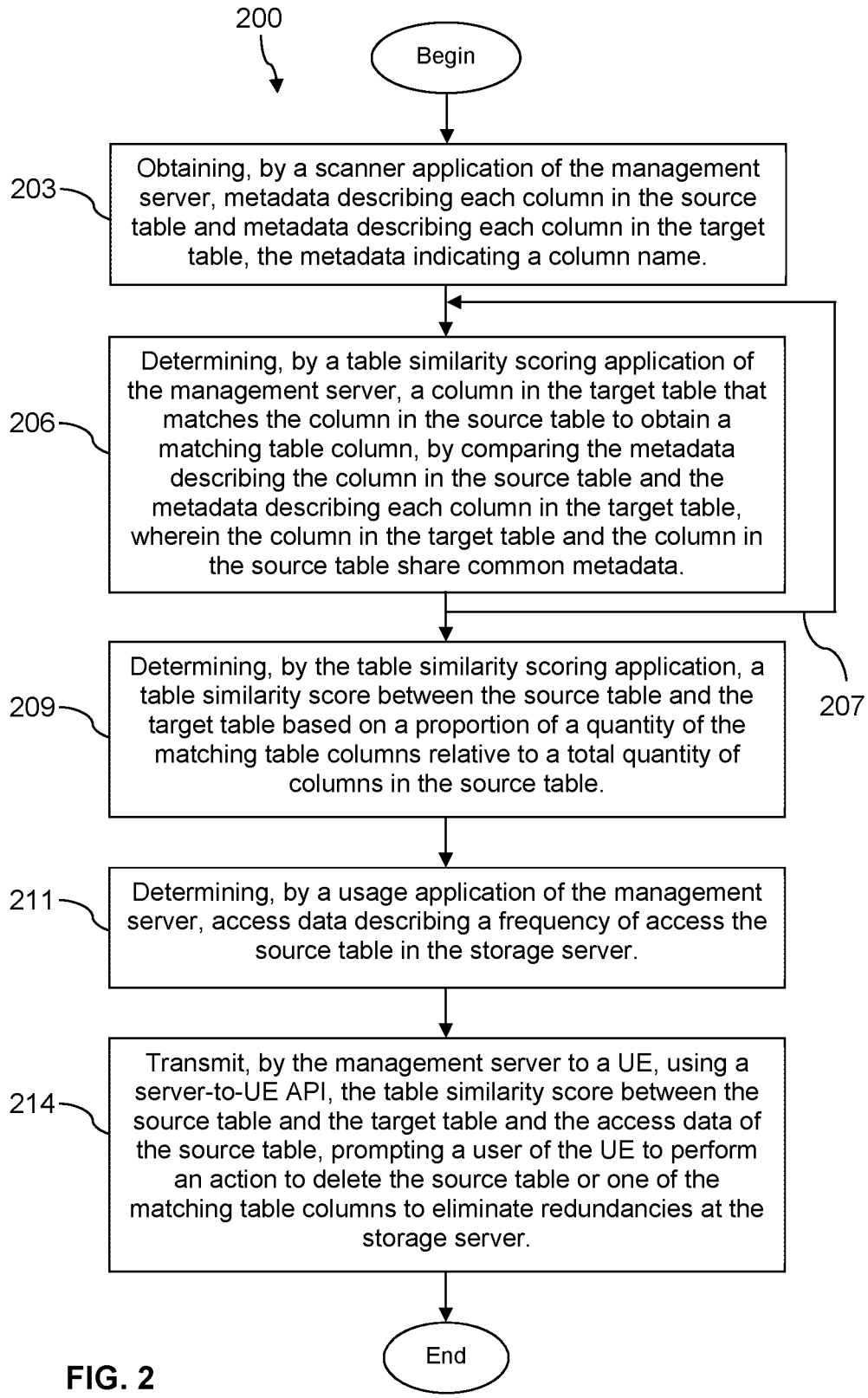
FIG. 2 is a flow chart of a method performed by the management server in the system of FIG. 1 to determine a table similarity score according to an embodiment of the disclosure.

Referring now to FIG. 2, a method 200 is described. In an embodiment, the method 200 is a method for analyzing similarities across tables 152A-C to determine the table similarity score 132 and perform de-duplication at the storage server 104. The method 200 may be performed by the management server 102 after data of a service providing company has been migrated to the storage server 104 for storage at one or more databases 150A-B.

At step 203, method 200 comprises obtaining, by the scanner application 118 of the management server 102, metadata 138 describing each column 153A in the source table 152A and metadata 138 describing each column 153B in the target table 152B. In an embodiment, the management server 102 may determine the metadata 138 to be used to determine the table similarity score 132 based on a policy. The policy may specify the type of metadata 138 that should be compared in the source table 152A and target table 152B to determine the table similarity score 132. For example, a policy may indicate that the table similarity score 132 is to be determined based on at least two items of metadata 138 in the storage index 136 (i.e., the table name 140, physical path 142, column name 144, row count 145, size 146, last access 147 of the table 152A-C, and/or a data format 149 of the databases 150A-B, tables 152A-C in the databases 150A-B, or the columns 153A-C in the tables 152A-C).

For example, suppose the policy for the table similarity score 132 indicates that the table similarity score 132 is to be determined based on the column names 144 of the columns 153A-B within the source table 152A and the target table 152B. In this example, the scanner application 118 may obtain the column name 144 of each column 153A in the source table 152A, and obtain the column name 144 of each column 153B in the target table 152B.

At step 206, method 200 comprises determining, by a table similarity scoring application 120 of the management server 102, a column 153B in the target table 152B that matches the column 153A in the source table 152A to obtain a matching column. In an embodiment, the table similarity scoring application 120 may obtain the matching column by comparing the metadata 138 describing the column 153A in the source table 152A and the metadata 138 describing each column 153B in the target table 152B. In this case, the column 153B in the target table 152B and the column 153A in the source table 152A share common metadata 138.

Continuing with the example above, the table similarity scoring application 120 may compare the column name 144 of a first column 153A in the source table 152A with the column name 144 of every column 153B in the target table 152B, to determine whether the column names 144 match or substantially match. In an embodiment, a determination of whether the column names 144 match may be performed using a string pattern matching algorithm, as further described below. In an embodiment, a data format 149 of the column names 144 should match for the column names 144 to match or substantially match. When the column name 144 and data format 149 in the source table 152A matches a column name 144 and data format 149 in the target table 152B, the column 153A corresponding to the column name 144 in the source table 152 may be considered a matching column.

The table similarity scoring application 120 may perform step 206 for each column 153A in the source table 152A to determine whether each column 153A in the source table 152 is a matching column, as shown by arrow 207. For example, suppose the source table 152A has three columns, and the target table 152B has five columns. In this case, the table similarity scoring application 120 first performs step 206 for the first column 153A in the source table 152A, then performs step 206 for the second column 153A in the source table 152A, and finally performs step 206 for the third column 153A in the source table 152A. As described above, each iteration of step 206 involves a comparison of one column 153A in the source table 152A with all the columns 153B in the target table 152B, to determine one or more matching columns in the source table 152A.

At step 209, method 200 comprises determining, by the table similarity scoring application 120, the table similarity score 132 between the source table 152A and the target table 152B based on a proportion of a quantity of the matching columns in the source table 152A relative to a total quantity of columns 153A in the source table 152A. In an embodiment, the table similarity score 132 is the proportion identified in step 209. In an embodiment, steps 203, 206, and 209 may be repeated between every other combination and permutation of tables 152A-C within the same database 150A or across different databases 150A-B to generate multiple table similarity scores 132.

Continuing with the example described above, suppose that two out of the three columns 153A in the source table 152A are matching data columns (i.e., columns 153A in the source table 152A that have column names 144 similar to one or more columns 153B in the target table 152B). In this case, the quantity of matching columns in the source table 152A is 2, and the total quantity of columns 153A in the source table 152A is 3. The proportion, or percentage, of the quantity of the matching columns in the source table 152A relative to the total quantity of columns 153A in the source table 152A is ⅔, 0.67, or ~67 percent (%). As such, the table similarity score 132 between the source table 152A and the target table 152B is also ⅔, 0.67, or 67%, indicating that the source table 152A and the target table 152B are likely to share 67% of the same or similar data.

At step 211, method 200 comprises determining, by a usage application 124 of the management server 102, access data 141 describing a frequency of access of the source table 152A in the storage server 104. The usage application 124 may monitor access to the data stored at the storage server 104, and listen to access events occurring at the tables 152A-C. The usage application 124 may be triggered to record details regarding each access request associated with a table 152A-C or a column 153A-C, such as, for example, a count of accessing the table 152A-C or column 153A-C, and time of access the table 152A-C or column 153A-C. In this way, the usage application 124 maintains a record of access data 141 to the table 152A-C or column 153A-C, which may be used to determine the timestamp of last access 147, and determine a frequency of accessing the table 152A-C or column 153A-C within a predefined period of time.

Continuing with the example above, the access data 141 of the source table 152A may indicate that the two matching columns in the source table 152A have not been accessed in over a year. In an embodiment, this information, in conjunction with the table similarity score 132, may be helpful to a user in determining whether the source table 152A or the matching data columns may be deleted or archived.

In an embodiment, the management server 102 may use the access data 141 to suggest more insightful redirection or recommendation on data storing to avoid duplication of infrequently accessed data. The management server 102 may also use the access data 141 to consolidate data consistent with the most common uses of various columns 153A-C and sources of those columns. For example, the access data 141 may indicate the columns 153A-C of data that are accessed together frequently. The management server 102 may use the access data 141 to create new tables 152 or databases 150 that include columns 153A-C that are frequently accessed together. As another example, the access data 141 may indicate that certain subdivisions within a company frequently access certain columns 153A-C of data. The management server 102 may use this access data 141 to create new tables 152 or databases 150 that include columns 153A-C that are frequently accessed together by the subdivision.

At step 214, method 200 includes transmitting, by the management server 102 to a UE 106A-B, using the server-to-UE API 126, the table similarity score 132 between the source table 152A and the target table 152B, and the access data 141 of the source table 152A. In an embodiment, the UE 106A-B receives the table similarity score 132 and the access data 141 via the UE-to-server API 112, and the storage application 116 processes the table similarity score 132 and the access data 141 to generate a notification. The notification may include a prompt for the user to perform an action to delete the source table 152A or one of the matching columns to eliminate redundancies at the storage server 104.

In an embodiment, UE 106A-B may display the notification using the storage UI 114. For example, the notification may display the table similarity score 132 with a visual representation of the data stored at the source table 152A and the target table 152B, for the user to confirm that the matching columns do in fact store redundant data. The notification may also indicate the access data 141 in a manner such that the user is notified if the data in the matching columns are infrequently accessed or has not been accessed for over an extended period of time. The storage UI 114 may also provide a user input for the user to either select or enter an input, signaling the UE 106A-B to either trigger deletion of the matching columns from the storage server 104 or maintain storage of the matching columns at the storage server 104. The storage server 104 may only delete data from the source table 152A in response to explicitly receiving instructions to delete data from an authorized UE 106A-B.

In an embodiment, the scanner application 118 obtains column names 144 of columns 153A in the source table 152A and a list of similar column names 144 of columns 153B in the target table 152B. In this embodiment, the table similarity scoring application 120 computes a percentage of similarity between columns 153A of the source table 152B to determine the table similarity score 132, as described herein.

As described above, the table similarity scoring application 120 may compare column names 144 using string pattern matching to find column names 144 that may not identically match, but likely still refer to the same type of data. For example, example a column name 144 "DEALER-NAME:STRING" and another column name 144 "DEALER_NAME:STRING" are not identical strings, but still may be considered as matching column names 144 using a string pattern matching algorithm. String pattern matching may be performed using algorithms that compare and match strings, such as, for example, a Boyer-Moore (BM) algorithm, a Knuth Morris Pratt (KMP), or any other algorithm for comparing and matching strings.

In one embodiment, the scanner application 118 may scan the column names 144 in all the tables 152A-C stored in the storage server 104, and then identify similar column names 144 used throughout the storage server 104 using string pattern matching. A mapping between these similar column names 144 may be stored in the non-transitory memory 130. An example of such a mapping is shown below in Table 1:

TABLE 1

| Column | Similar Columns |
|---|---|
| "DEALERNAME:STRING" | ["DEALERNAME:STRING", "DEALER_NAME:STRING", "DAELERNAME:STRING"] |
| "MSISDN_ID" | ["MSISDN_ID:NUMERIC, "ID_MSISDN:NUMERIC"] |

In another embodiment, the table similarity scoring application 120 may perform string pattern matching during each iteration of comparing strings of metadata 138, for example, in step 206 of method 200. In this embodiment, table similarity scoring application 120 may compare strings of metadata 138 to obtain a string matching score, which is a value indicating a level of similarity between two items of metadata 138. For example, the table similarity scoring application 120 may compare a column name 144 of column 153A with a column name 144 of column 153B to determine a string matching score, indicating a level of similarity between the two column names 144.

For example, Table 2 below shows the string matching score determined for a string pair using a string pattern matching algorithm:

TABLE 2

| match_string | match_string1 | String_matching_score |
|---|---|---|
| banana | Banana | 1.0 |
| banana | Banana | 0.8333333333333330 |
| banana | Apple | 0.18181818181818200 |
| banana | APPLE | 0.0 |
| banana | Tablename | 0.4 |
| banana | table name | 0.375 |
| banana | table_name | 0.375 |
| Banana | Banana | 0.8333333333333330 |
| Banana | Banana | 1.0 |
| Banana | Apple | 0.18181818181818200 |
| Banana | APPLE | 0.0 |
| Banana | Tablename | 0.4 |
| Banana | table name | 0.375 |
| Banana | table_name | 0.375 |
| apple | Banana | 0.18181818181818200 |
| apple | Banana | 0.18181818181818200 |
| apple | Apple | 1.0 |
| apple | APPLE | 0.0 |
| apple | Tablename | 0.42857142857142900 |
| apple | table name | 0.4 |
| apple | table_name | 0.4 |
| APPLE | Banana | 0.0 |
| APPLE | Banana | 0.0 |
| APPLE | Apple | 0.0 |
| APPLE | APPLE | 1.0 |
| APPLE | Tablename | 0.0 |
| APPLE | table name | 0.0 |
| APPLE | table_name | 0.0 |
| tablename | Banana | 0.4 |
| tablename | Banana | 0.4 |
| tablename | Apple | 0.42857142857142900 |
| tablename | APPLE | 0.0 |
| tablename | Tablename | 1.0 |
| tablename | table name | 0.9473684210526320 |
| tablename | table_name | 0.9473684210526320 |
| table name | Banana | 0.375 |
| table name | Banana | 0.375 |
| table name | Apple | 0.4 |
| table name | APPLE | 0.0 |
| table name | Tablename | 0.9473684210526320 |
| table name | table name | 1.0 |
| table name | table_name | 0.9 |
| table_name | Banana | 0.375 |
| table_name | Banana | 0.375 |
| table_name | Apple | 0.4 |
| table_name | APPLE | 0.0 |
| table_name | Tablename | 0.9473684210526320 |
| table_name | table name | 0.9 |
| table_name | table_name | 1.0 |

As shown above, exact string matches (e.g., "banana" and "banana") may have a string matching score of 1. Completely different strings (e.g., "banana" and "apple") may have a much lower string matching score. Strings that are similar but slightly different (e.g., "table_name" and "table-name") may have a string matching score closer to 1. The string matching scores shown in Table 2 are merely examples, and the actual value of the string matching score does not necessarily need to be between 0 and 1.

In an embodiment, the table similarity scoring application 120 may only determine that two strings of metadata 138, such as column names 144, match when the string matching score is greater than or equal to a pre-defined threshold. The pre-defined threshold may be a threshold value indicating that two strings having string matching scores greater than or equal to the threshold are considered to be matching or substantially matching. For example, the pre-defined threshold may be 0.95. In this way, the table similarity scoring application 120 may compare to strings of metadata 138 and determine that the strings match, even when the strings are not identical.

Figure 3:
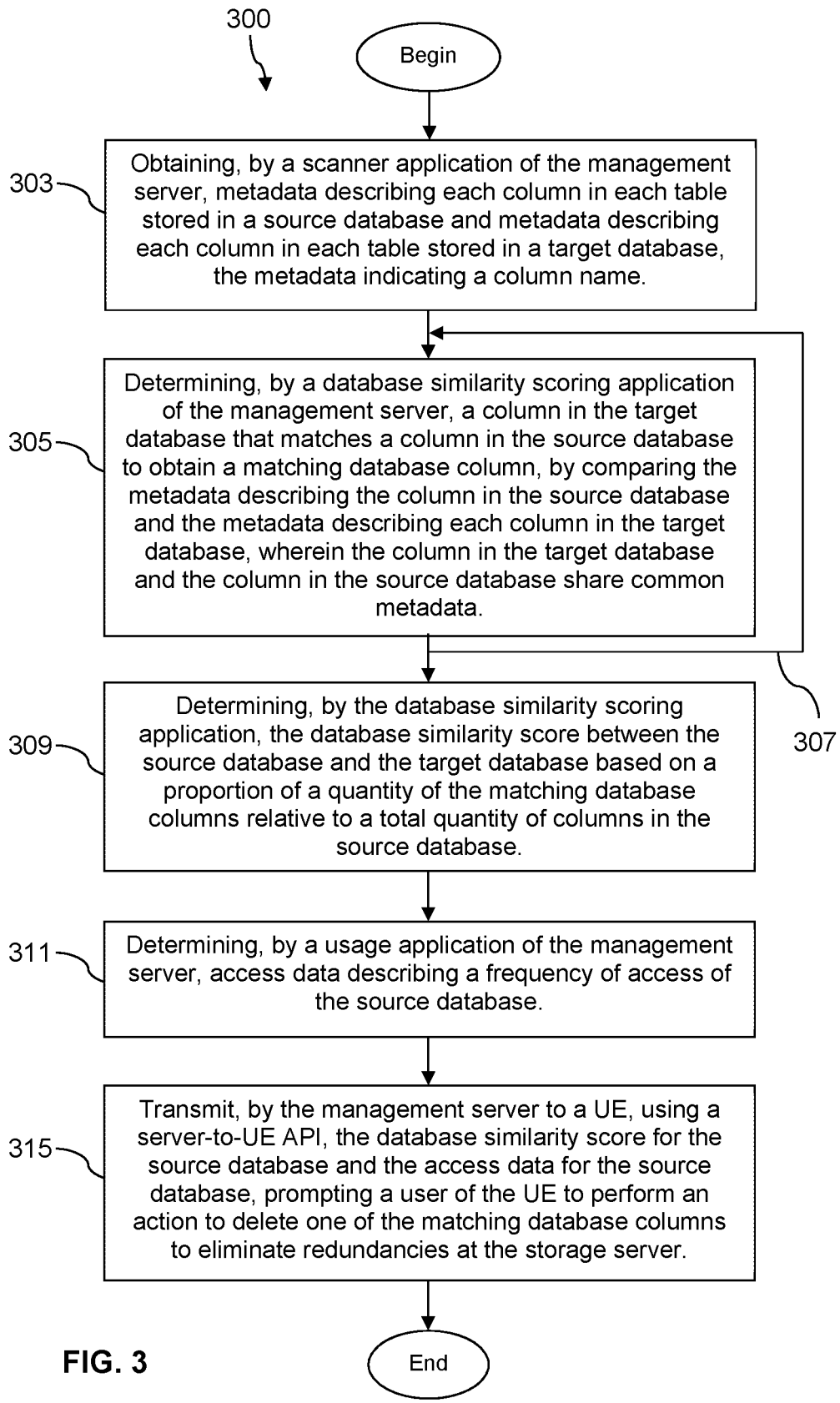
FIG. 3 is a flow chart of a first method performed by the management server in the system of FIG. 1 to determine a database similarity score according to an embodiment of the disclosure.

Turning now to FIG. 3, a method 300 is described. In an embodiment, the method 300 is a method for analyzing similarities across databases 150A-B to determine the database similarity score 134 and perform de-duplication at the storage server 104. The method 300 may be performed by the management server 102 after data of a service providing company has been migrated to the storage server 104 for storage at two or more databases 150A-B.

At step 303, method 300 comprises obtaining, by the scanner application 118 of the management server 102, metadata 138 describing each column 153A-B in each table 152A-B stored in a source database 150A and metadata 138 describing each column 153C in each table 152C stored in a target database 150B. In an embodiment, the management server 102 may determine the metadata 138 to be used to determine the table similarity score 132 based on a policy. The policy may specify the type of metadata 138 that should be compared in the source database 150A and target database 150B to determine the database similarity score 134.

For example, suppose the policy for the database similarity score 134 indicates that the database similarity score 134 is to be determined based on the column names 144 of all the columns 153A-C within the source database 150A and the target database 150B. In this example, the scanner application 118 may obtain the column name 144 of each column 153A-B in the source database 150A, and obtain the column name 144 of each column 153C in the target database 150B.

At step 305, method 300 comprises determining, by a database similarity scoring application 122 of the management server 102, a column 153C in the target database 150B that matches a column 153A-B in the source database 150A to obtain a matching database column. In an embodiment, the database similarity scoring application 122 may obtain the matching database column by comparing the metadata 138 describing the column 153A-B in the source database 150B and the metadata 138 describing each column 153C in the target database 150B. In this case, the column 153C in the target database 150B and the column 153A-B in the source database 150A share common metadata 138.

Continuing with the example above, the database similarity scoring application 122 may compare the column name 144 of a first column 153A in the source table 152A in the source database 150A with the column name 144 of every column 153B in the target tables 152B in the target database 150B, to determine whether the column names 144 match or substantially match. The database similarity scoring application 122 may use string pattern matching and string matching scores to determine whether the column names 144 match or substantially match, as described above. In an embodiment, a data format 149 of the column names 144 should match for the column names 144 to match or substantially match. When the column name 144 and data format 149 in the source database 150A matches a column name 144 and data format 149 in the target database 150B, the column 153A corresponding to the column name 144 in the source database 150A may be considered a matching column.

The database similarity scoring application 122 may perform step 305 for each column 153A in each table 152A-B in the source database 150 to determine whether each column 153A in the source database 150A is a matching column, as shown by arrow 307. As described above, each iteration of step 305 involves a comparison of one column 153A-B in the source database 150A with all the columns 153B in the target database 150B, to determine whether the one column 153A-B in the source database 150A is a matching data column.

As another illustrative example, Table 3 below illustrates comparisons between columns 153A-C of different databases 150A-B to determine the database similarity scores 134:

TABLE 3

| Source DB | Total Columns | Target DB | Target Total columns | Total Matching Data Columns | Database Similarity Score |
|---|---|---|---|---|---|
| DB1 | 1500 | DB2 | 1800 | 1000 | 0.66 |
| DB3 | 5877 | DB4 | 5680 | 4635 | 0.78 |
| DB5 | 9222 | DB6 | 7816 | 6009 | 0.65 |
| DB7 | 13888 | DB8 | 10878 | 7178 | 0.51 |
| DB9 | 15773 | DB10 | 13236 | 8204 | 0.52 |

As shown above, Table 3 illustrates that the quantity of matching data columns between two different databases 150A-B may be used to determine the database similarity scores 134 between the two different databases 150A-B.

At step 309, method 300 comprises determining, by the database similarity scoring application 122, the database similarity score 134 between the source database 150A and the target database 150B based on a proportion of a quantity of the matching columns in the source database 150A relative to a total quantity of columns 153A-B in the source database 150. In an embodiment, the database similarity score 134 is the proportion identified in step 309. In an embodiment, steps 303, 305, and 309 may be repeated between every other combination and permutation of tables 152A-C between the different databases 150A-B to generate multiple database similarity scores 134.

At step 311, method 300 comprises determining, by a usage application 124 of the management server 102, access data 141 describing a frequency of access of the source database 150A in the storage server 104. The usage application 124 may determine the access data 141 related to databases 150A-B in a manner similar to that described above with regard to step 211 of method 200. The usage application 124 may monitor access to the data stored at the storage server 104, and listen to access events occurring at the databases 150A-B. The usage application 124 maintains a record of access data 114 to the databases 150A-B, tables 152A-C in the databases, or columns 153A-C in the tables 152A-C, which may be used to determine the timestamp of last access 147. The usage application 124 may also use the record of access data 141 to determine a frequency of accessing the databases 150A-B, tables 152A-C in the databases, or columns 153A-C within a predefined period of time.

At step 315, method 300 includes transmitting, by the management server 102 to a UE 106A-B, using the server-to-UE API 126, the database similarity score 134 between the source database 150A and the target database 150B, and the access data 141 of the source database 150A. In an embodiment, the UE 106A-B receives the database similarity score 134 and the access data 141 via the UE-to-server API 112, and the storage application 116 processes the database similarity score 134 and the access data 141 to generate a notification. The notification may include a prompt for the user to perform an action to delete a table 152A-B or a column 153A-B from the source database 150A to eliminate redundancies at the storage server 104.

In an embodiment, UE 106A-B may display the notification using the storage UI 114. For example, the notification may display the database similarity score 134 with a visual representation of the data stored at the source database 150A and the target database 150B, for the user to confirm that the matching columns do in fact store redundant data. The notification may also indicate the access data 141 in a manner such that the user is notified if the data in the matching columns are infrequently accessed or has not been accessed for over an extended period of time. The storage UI 114 may also provide a user input for the user to either select or enter an input signaling the UE 106A-B to either trigger deletion of the matching columns from the storage server 104 or maintain storage of the matching columns at the storage server 104. The storage server 104 may only delete data from the source database 150 in response to explicitly receiving instructions to delete data from an authorized UE 106A-B.

Figure 4:
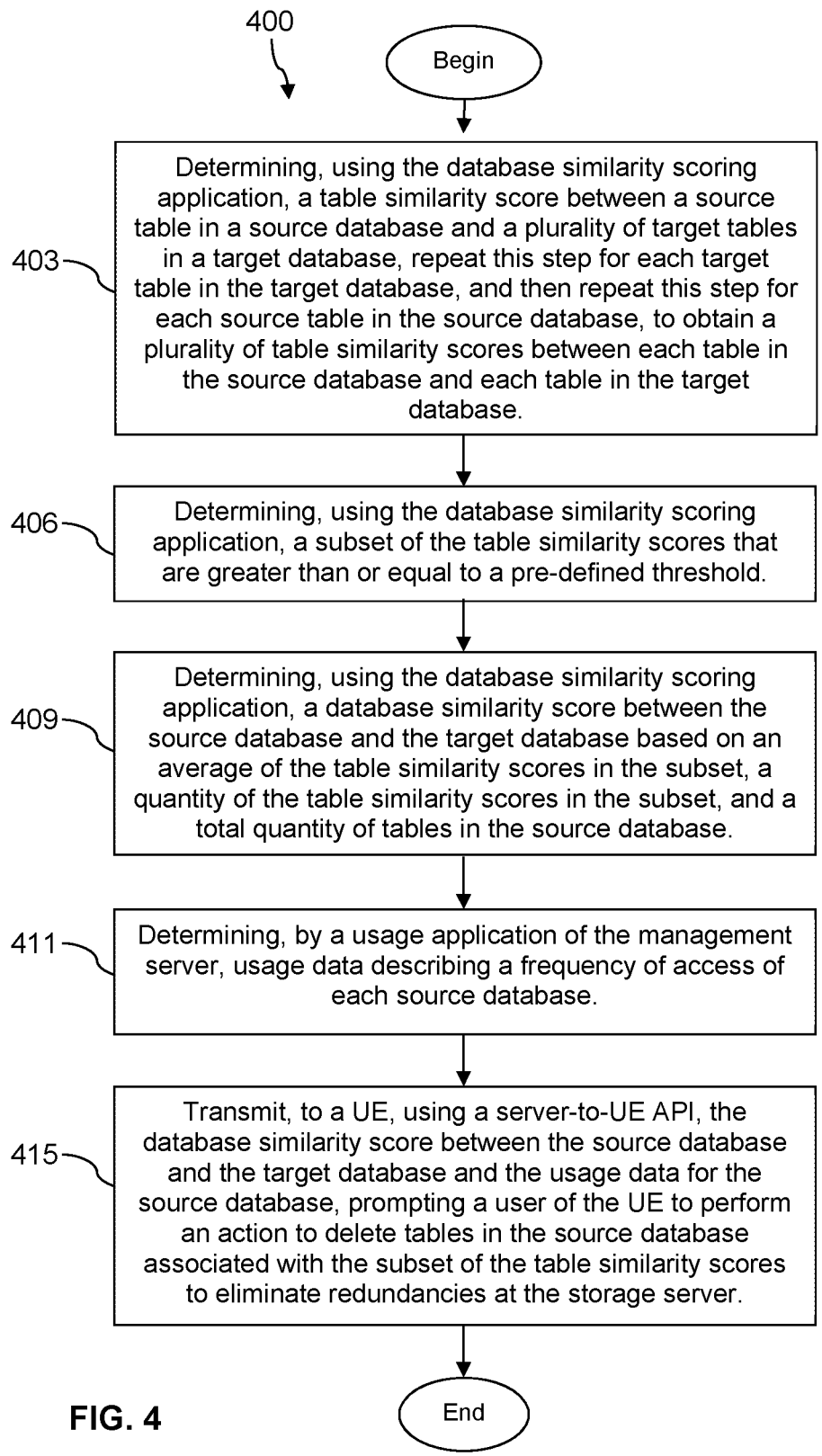
FIG. 4 is a flow chart of a second method performed by the management server in the system of FIG. 1 to determine a database similarity score according to an embodiment of the disclosure.

Turning now to FIG. 4, a method 400 is described. In an embodiment, the method 400 is another method for analyzing similarities across databases 150A-B to determine the database similarity score 134 and perform de-duplication at the storage server 104. The method 400 may be performed by the management server 102 after data of a service providing company has been migrated to the storage server 104 for storage at two or more databases 150A-B.

At step 403, method 400 comprises determining, using the database similarity scoring application 122, a table similarity score 132 between a source table 152A in a source database 150A and a plurality of target tables 152C in a target database 150B, for example, based on method 200 of FIG. 2. For example, the database similarity scoring application 122 may iteratively compare the metadata 138 of the source table 152A in the source database 150A and the metadata 138 of each of the tables 152C in the target database 150B. The database similarity scoring application 122 may repeat step 403 for every table 152A-B in the source database 150. For example, in a first iteration, table 152A may be the source table used to determine the table similarity score 132, in a second iteration, table 152B may be the source table used to determine the table similarity score 132 relative to each of tables 152B in the target database 150B, and so on.

As an illustrative example, suppose the source database 150A includes two tables 152A and 152B, and the target database 150B includes three tables 153C. In this example, the database similarity scoring application 122 determines a first table similarity score 132 between table 152A and the first table 152C in the target database 150B, a second table similarity score 132 between table 152A and the second table 152C in the target database 150B, and a third table similarity score 132 between table 152A and the third table 152C in the target database 150B. Next, the database similarity scoring application 122 determines a fourth table similarity score 132 between table 152B and the first table 152C in the target database 150B, a fifth table similarity score 132 between table 152B and the second table 152C in the target database 150B, and a sixth table similarity score 132 between table 152B and the third table 152C in the target database 150B. In this example, six table similarity scores 132 are determined by comparing five tables 152A-C across different databases 150A-B in the storage server 104.

At step 406, method 400 comprises determining, using the database similarity scoring application 122, a subset of the table similarity scores 132 that are greater than or equal to a pre-defined threshold. In an embodiment, the pre-defined threshold may be preset by an operator of the storage server 104 or by the service providing company owning the data in the databases 150A-B. The pre-defined threshold may be a threshold value indicating that tables 152A-C having table similarity scores 132 above the threshold are considered to be matching or substantially matching tables 152A-B.

Continuing with the example above, suppose that that first table similarity score is 0.3, the second table similarity score is 0.98, the third table similarity score is 0.75, the fourth table similarity score, is 0.25, the fifth table similarity score is 0.97, and the sixth table similarity score is 0. Further, suppose the pre-defined threshold is 0.95. In this case, the second table similarity score and the fifth table similarity score are greater than or equal to the threshold. The subset of the table similarity scores 132 greater than the threshold include the second table similarity score 132 between table 152A and the second table 152C in the target database 150B, and the fifth table similarity score 132 between table 152B and the second table 152C in the target database 150B.

At step 409, method 400 comprises determining, by the database similarity scoring application 122, a database similarity score 134 between the source database 150A and the target database 150B based on an average of the table similarity scores 132 in the subset, a quantity of the table similarity scores 132 in the subset, and a total quantity of tables 152A-B in the source database 150A.

In an embodiment, the database similarity scoring application 122 first computes the average of the table similarity scores 132 in the subset determined in step 409. Continuing with the example, the average of the second table similarity score 132 (0.98) and the fifth table similarity score 132 (0.97) is (0.98+0.97)/2=0.975. The database similarity scoring application 122 may then compute a product of the average and the quantity of the table similarity scores 132 in the subset used to calculate the average. In the example, the product of the average and the quantity of table similarity scores 132 in the subset is (0.975)(2)=1.95. Lastly, the database similarity scoring application 122 may divide the product by the total quantity of tables 152A-B in the source database 150 to determine the database similarity score 134 between the first database 150A and the second database 150B. In the example database similarity score 134 is 1.95/2=0.975.

In this case, the calculation of the database similarity score 134 may be performed according to the equation:

$$DSS = \frac{(\text{AVG}(TSS \text{ in the Subset}))(\text{Quantity of } TSS \text{ in the Subset})}{\text{Total Quantity of Tables in Source Database}}$$

In another case, the calculation of the database similarity score 134 may be performed according to the equation:

$$DSS = (\text{AVG}(\text{Max\_Similarity\_Score})) \times \frac{\text{Quantity of Searched Similar Tables}}{\text{Quantity of Total Tables in Source Database}}$$

At step 411, method 400 comprises determining, by a usage application 124 of the management server 102, access data 141 describing a frequency of access of the source database 150A in the storage server 104. The usage application 124 may determine the access data 141 related to databases 150A-B in a manner similar to that described above with regard to step 211 of method 200. The usage application 124 maintains a record of access data 141 to the databases 150A-B, tables 152A-C in the databases, or columns 153A-C in the tables 152A-C, which may be used to determine the timestamp of last access 147. The usage application 124 may also use the record of access data 141 to determine a frequency of accessing the databases 150A-B, tables 152A-C in the databases, or columns 153A-C within a predefined period of time.

At step 415, method 400 includes transmitting, by the management server 102 to a UE 106A-B, using the server-to-UE API 126, the database similarity score 134 between the source database 150A and the target database 150B, and the access data 141 of the source database 150A. In an embodiment, the UE 106A-B receives the database similarity score 134 and the access data 141 via the UE-to-server API 112, and the storage application 116 processes the database similarity score 134 and the access data 141 to generate a notification. The notification may include a prompt for the user to perform an action to delete a table 152A-B or a column 153A-B from the source database 150A to eliminate redundancies at the storage server 104, similar to step 315 in method 300.

Figure 5:
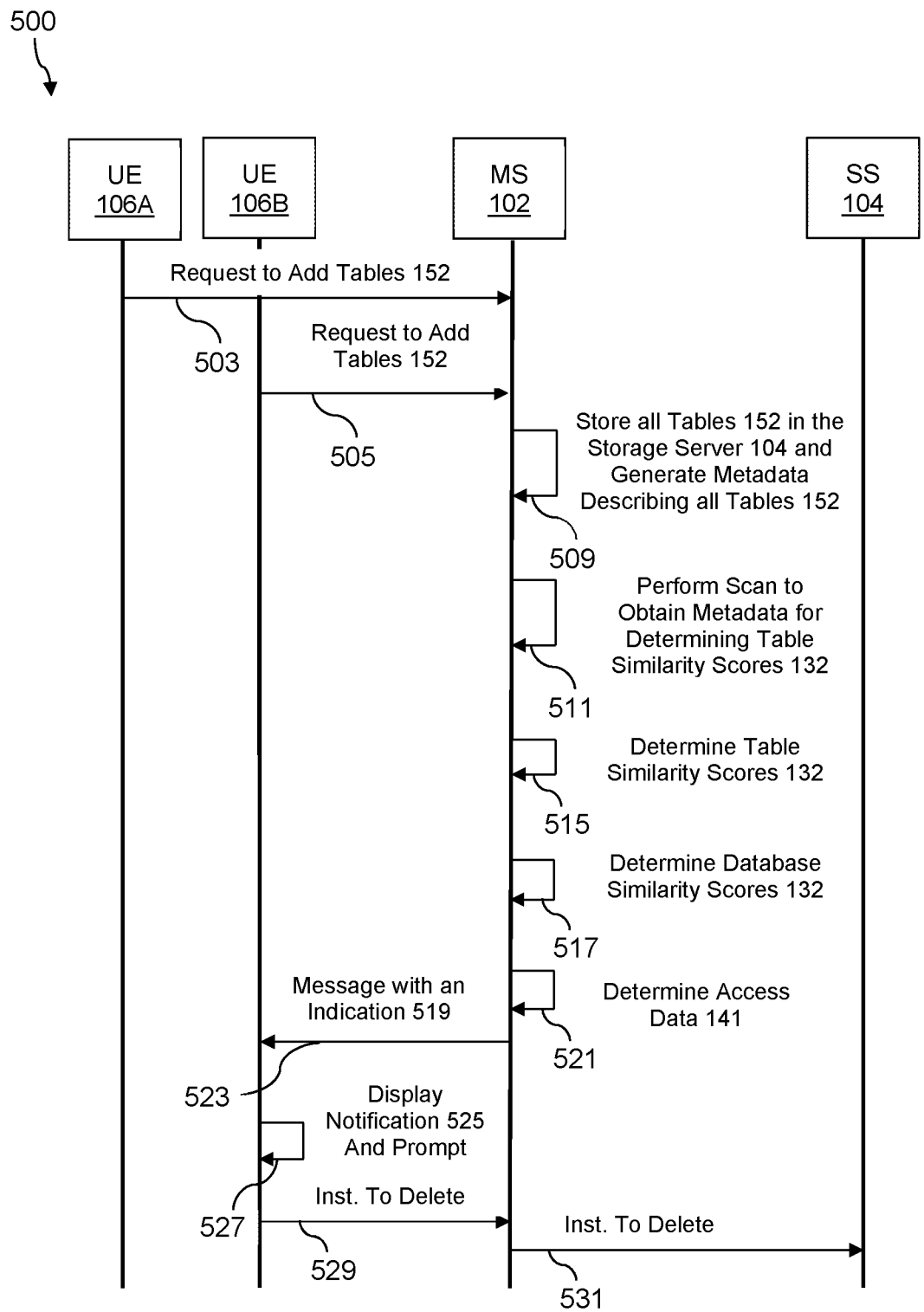
FIG. 5 is a message sequence diagram of a method performed by the system of FIG. 1 according to an embodiment of the disclosure.

Referring now to FIG. 5, a message sequence diagram illustrating a method 500 for analyzing similarities across tables 152A-C and databases 150A-B to perform de-duplication at the storage server 104. The method 500 is performed by the UEs 106A-B, the management server 102 (shown in FIG. 4 as the "MS 102"), and the storage server 104 (shown in FIG. 4 as the "SS 104"). For example, method 500 may be performed when the UEs 106A-C begin instructing the migration of data to the storage server 104.

At step 503, UE 106A may transmit, to the management server 102, using the UE-to-server API 112, a request to add one or more tables 152A-C (hereinafter referred to as "tables 152") to the storage server 104. In some cases, the request may include the tables 152 (e.g., the content within the tables 152), an identifier of UE 106A, an identifier of a subdivision of the service providing company to which the UE belongs, and/or other data associated with the tables 152, the UE 106A, or the subdivision. In some cases, the request may also include an address of location at which the tables 152 were stored prior to the request to migrate the tables 152 to the storage server 104. The tables 152 requested to be added by UE 106A may include columns 153A-C (hereinafter referred to as "columns 153") and rows of data used by the subdivision service provider to conduct business.

At step 505, UE 106B may transmit, to the management server 102, using the UE-to-server API 112, a request to add one or more tables 152 to the storage server 104. In an embodiment, UE 106B may belong to a different subdivision of the service providing company than UE 106A. The tables 152 requested to be added by UE 106B may include columns and rows of data used by the subdivision of the service provider to conduct business.

At step 509, after the management server 102 receives, using the server-to-UE API 126, the requests to add tables 152 from UEs 106A-B, the scanner application 118 may store all the tables 152 into one or more databases 150A-B of the storage server 104. For example, the tables 152 requested to be added by UE 106A may be stored to a first storage container in the storage server 104 associated with a first subdivision, and the tables 152 requested to be added by UE 106B may be stored to a second storage container in the storage server 104 associated with a second sub-division.

In addition, at step 509, the scanner application 118 may also obtain metadata 138 describing each of the tables 152 added to the storage server 104, and add the metadata 138 to the storage index 136. The storage index 136 may thus provide an overview of the tables 152 stored across the databases 150A-B in the storage server 104.

In an embodiment, the table similarity scoring application 120 and the database similarity scoring application 122 may each be triggered to compute the table similarity scores 132 and the database similarity scores 134, respectively, according to a pre-determined schedule set by the operator of the storage server 104 or the service provider. In another embodiment, the table similarity scoring application 120 and the database similarity scoring application 122 may each be triggered to compute the table similarity scores 132 and the database similarity scores 134, respectively, upon detection of certain events. For example, when the management server detects that new columns 153 of data are added to one or more tables 152 or new tables 152 are added to one or more databases 150A-B, the table similarity scoring application 120 and/or the database similarity scoring application 122 may each be triggered to compute the table similarity scores 132 and the database similarity scores 134.

In this case, the table similarity scoring application 120 and/or the database similarity scoring application 122 only computes the table similarity score 132 and/or the database similarity score 134 with regard to the newly added columns 153 or newly added tables 152. For example, when a table 152 is added to the database 150A, the table similarity scoring application 120 may perform the method 200 of FIG. 2 to determine one or more table similarity scores 132 between the newly added table 152 and other tables 152, in which the newly added table 152 may be considered the source table. However, instead of re-calculating the table similarity scores 132 for all the other tables 152, the table similarity scoring application 120 may perform the method 200 of FIG. 2 only for the newly added table 152. Similarly, the database similarity scoring application 122 may perform the method 300 of FIG. 3 of the method 400 of FIG. 4 only for the newly added table 152 and the database 150A-B in which the table 152 was added.

At step 511, the scanner application 118, the table similarity scoring application 120, or the database similarity scoring application 122 may obtain the metadata 138 from the storage index 136 that may be used to determine the table similarity scores 132 and the database similarity scores 134, as described above. At step 515, the table similarity scoring application 120 may determine one or more table similarity scores 132 between tables 152 in the storage server 104 by, for example, performing steps 203, 206, and 209 of method 200. At step 517, the database similarity scoring application 122 may determine one or more database similarity scores 134 between the databases 150A-B in the storage server 104 by, for example, performing steps 303, 305, and 309 of method 300, or performing steps 403, 406, and 409 of method 400. At step 521, the usage application 124 may determine the access data 141 for a source database 150A-B, a source table 152, or a column 153 in the storage server 104 by, for example, performing step 211 of method 200, performing step 311 of method 300, or performing step 411 of method 400.

At step 523, the management server 102 may transmit, to the UE 106B, using the server-to-UE API 126, a message including the table similarity score 132, database similarity score 134, access data 141, and an indication 519 that duplicates of data, or redundant data, may be stored in one of the databases 150A-B, tables 152, or columns 153. The indication 519 may indicate that the UE 106B, or a subdivision of the service providing company to which the UE 106B belongs, stores data in one of the databases 150A-B, tables 152, or columns 153 with redundant data. For example, the indication 519 may be a flag or bit in the message.

When the UE 106B receives this indication 519, using the UE-to-server API 112, at step 527, the storage application 116 may be triggered to display a notification 525 using the storage UI 114. The notification 525 may include text describing the table similarity score 132, database similarity score 134, and access data 141 in a manner that prompts the user to consider deleting redundant data at the storage server. The storage application 116 may also display, on the storage UI 114, a visual representation of the content of the data stored in the matching data columns determined in steps 151 and 517. In this way, the user may view or inspect the data stored at the storage server 104 before making any determination as to whether to delete data stored at the storage server 104.

The notification 525 may also include a user interface element, which prompts the user to enter or select an instruction to either trigger deletion of one or more of the matching data columns, or retain storage of the matching data columns. At step 529, the UE 106 transmits, using the UE-to-server API 112, an instruction to delete one or more of the matching data columns only upon receiving the user input or selection. At step 531, the management server 102 forwards, to the storage server 104, using the server-to-storage API 128, the instruction to delete one or more of the matching data columns, triggering the storage server 104 to delete the relevant data.

In one embodiment, the notification 525 indicates that the matching data columns will be deleted from the storage server 104 after a predetermined period of time (e.g., one week, one day, one month, etc.). In this case, when the user does not enter or select an instruction to retain storage of the matching data columns, then the management server 102 may be triggered to automatically forward, to the storage server 104, using the server-to-storage API 128, the instruction to delete one or more of the matching data columns, triggering the storage server 104 to delete the relevant data. In contrast, when the user enters or selects the instruction to retain storage of the matching data columns, then the management server 102 refrains from taking any action to ensure that the matching data columns are retained at the storage server 104.

In an embodiment, the management server 102 may automatically consolidate data at the storage server 104. For example, when data is being migrated from the local data stores to the centralized storage server 104 in a cloud-based environment, the management server 102 may scan the data being migrated to determine duplicate columns 153 within different tables 152, tables 152, or tables 152 across different databases 150. In this case, the management server 102 calculate the table similarity score 132 and a database similarity score 134 between tables 152 and databases 150 stored in the storage server 104 and data being migrated to the storage server 104. The management server 102 may automatically delete certain columns 153 or tables 152 to perform de-duplication of data, for example, based on the access data associated with the to be deleted columns 153 or tables 152.

In another embodiment, the scanner application 118 may periodically scan the data at the storage server 104 to calculate the table similarity scores 132 and the database similarity scores 104. The management server 102 may then automatically delete certain columns 153 or tables 152 to perform de-duplication of data, for example, based on the access data associated with the to be deleted columns 153 or tables 152. In some embodiments, the management server 102 may also determine that certain columns 153 of data or tables 152 are frequently accessed together or by certain entities, and trigger these columns 153 and tables 152 to be grouped together. As should be appreciated, these operations may be performed in local data stores and cloud-based data stores.

Figure 6:
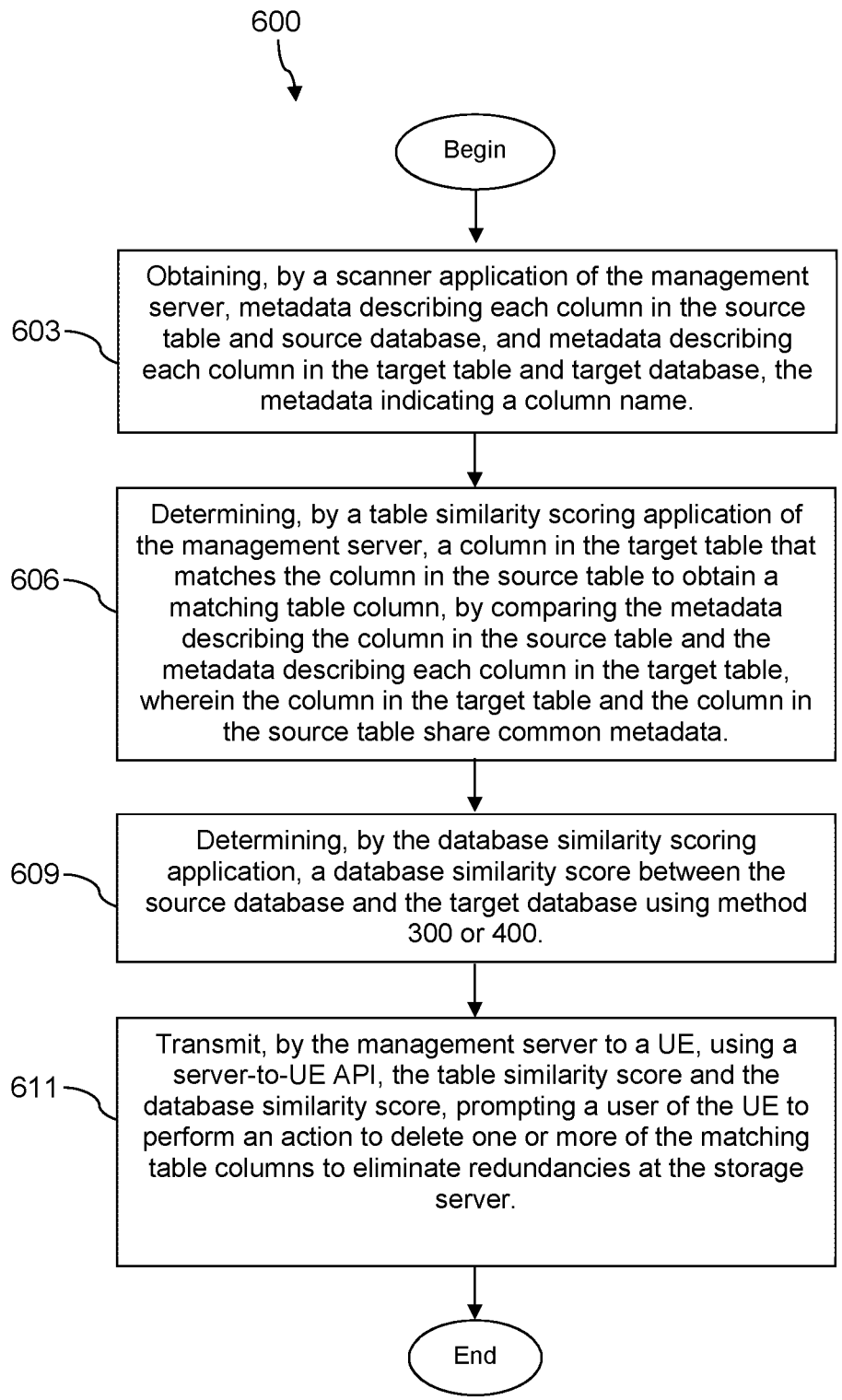
FIG. 6 is a flow chart of a method performed by a management server in the system of FIG. 1 to analyze similarities across tables and databases to perform de-duplication of data in the storage server according to an embodiment of the disclosure.

Turning now to FIG. 6, a method 600 is described. In an embodiment, the method 600 is a method for analyzing similarities across tables 152A-C and databases 150A-B to perform de-duplication at the storage server 104. The method 600 may be performed by the management server 102 after data has been migrated into the databases 150A-B at the storage server. Method 600 is similar to methods 200, 300, and 400, except that method 600 does not determine the access data 141 in performing de-duplication at the storage server.

At step 603, method 600 comprises obtaining, by the scanner application 118 of the management server 102, metadata 138 describing each column 153A in the source table 152A and source database 150A and metadata 138 describing each column 153B in the target table 152B and target database 150B. In an embodiment, the metadata 138 includes the column name 144.

At step 606, method 600 comprises determining, by a table similarity scoring application 120 of the management server 102, a column 153B in the target table 152B that matches the column 153A in the source table 152A to obtain a matching column. In an embodiment, the table similarity scoring application 120 may obtain the matching column by comparing the metadata 138 describing the column 153A in the source table 152A and the metadata 138 describing each column 153B in the target table 152B. In this case, the column 153B in the target table 152B and the column 153A in the source table 152A share common metadata 138. For example, the table similarity score 132 may be determined by performing steps 203, 206, and 209 of method 200.

At step 609, method 600 comprises determining, by the database similarity scoring application 122, a database similarity score 134 between the source database 150A and the target database 150B. For example, the database similarity score 134 may be determined by performing steps 303, 305, and 309 of method 300, or performing steps 403, 406, and 409 of method 400.

At step 611, method 600 comprises transmitting, to a UE 106A-B, using the server-to-UE API 126, the table similarity score 132 and the database similarity score 134 in a message, for example, comprising the indication 519. The UE 106A-B may receive the message and display a notification 525, which prompts the user of the UE to perform an action to delete data from the storage server 104 to eliminate redundancies, as described above. The UE 106A-B may be associated with the data at the storage server 104 that is prompted to be deleted.

Figure 7:
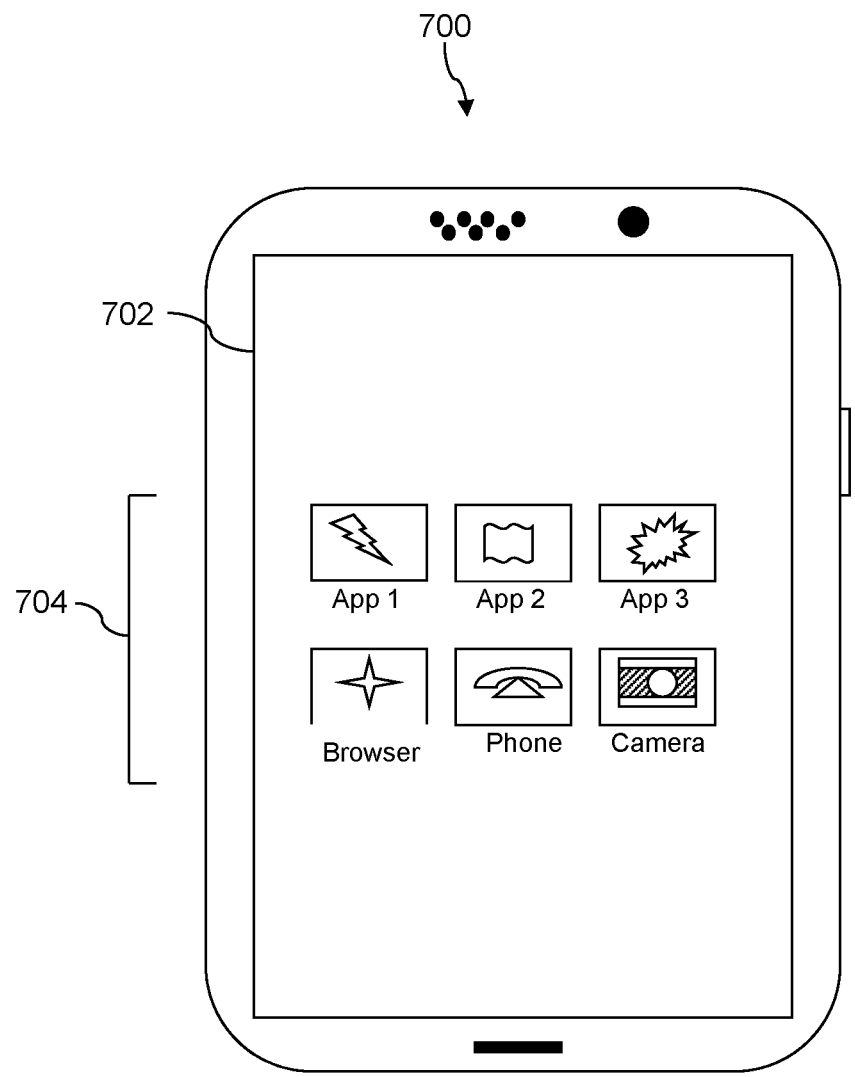
FIG. 7 is an illustration of a mobile communication device, such as the UE in the system of FIG. 1, according to an embodiment of the disclosure.

FIG. 7 depicts the UE 700, which is operable for implementing aspects of the present disclosure, but the present disclosure should not be limited to these implementations. In an embodiment, UEs 103A-C may be handsets similar to the UE 700. Though illustrated as a mobile phone, the UE 700 may take various forms including a wireless handset, a pager, a personal digital assistant (PDA), a gaming device, or a media player. The UE 700 includes a touchscreen display 702 having a touch-sensitive surface for input by a user. A small number of application icons 704 are illustrated within the touch screen display 702. It is understood that in different embodiments, any number of application icons 704 may be presented in the touch screen display 702. In some embodiments of the UE 700, a user may be able to download and install additional applications on the UE 700, and an icon associated with such downloaded and installed applications may be added to the touch screen display 702 or to an alternative screen. The UE 700 may have other components such as electro-mechanical switches, speakers, camera lenses, microphones, input and/or output connectors, and other components as are well known in the art. The UE 700 may present options for the user to select, controls for the user to actuate, and/or cursors or other indicators for the user to direct. The UE 700 may further accept data entry from the user, including numbers to dial or various parameter values for configuring the operation of the handset. The UE 700 may further execute one or more software or firmware applications in response to user commands. These applications may configure the UE 700 to perform various customized functions in response to user interaction. Additionally, the UE 700 may be programmed and/or configured over-the-air, for example from a wireless base station, a wireless access point, or a peer UE 700. The UE 700 may execute a web browser application which enables the touch screen display 702 to show a web page. The web page may be obtained via wireless communications with a base transceiver station, a wireless network access node, a peer UE 700 or any other wireless communication network or system.

Figure 8:
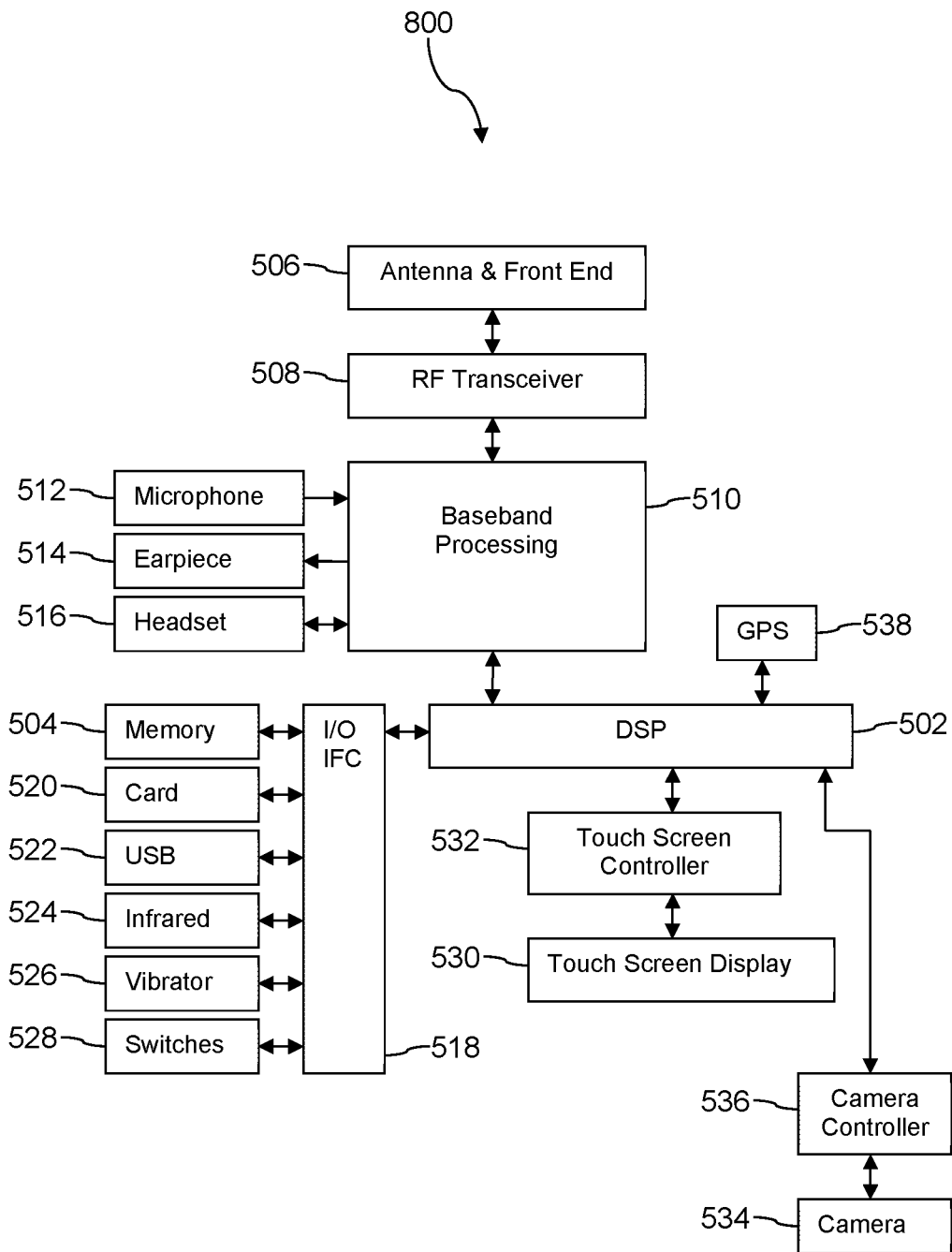
FIG. 8 is a block diagram of a hardware architecture of a mobile communication device, such as the UE in the system of FIG. 1, according to an embodiment of the disclosure.

FIG. 8 shows a block diagram of the UE 800. In an embodiment, UEs 106A-B may be implemented on a hardware device, and include hardware components, similar to UE 800. While a variety of known components of handsets are depicted, in an embodiment a subset of the listed components and/or additional components not listed may be included in the UE 800. The UE 800 includes a digital signal processor (DSP) 502 and a memory 504. As shown, the UE 800 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 800 may include another kind of display that does not provide a touch sensitive screen. In an embodiment, the UE 800 may include both the touch screen display 530 and additional display component that does not provide a touch sensitive screen. In an embodiment, the DSP 502 may communicate directly with the memory 504 without passing through the input/output interface 518. Additionally, in an embodiment, the UE 800 may comprise other peripheral devices that provide other functionality.

The DSP 502 or some other form of controller or central processing unit operates to control the various components of the UE 800 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 800 to function as a peripheral device to exchange information with a personal computer or other computer system. The infrared port 524 and other optional ports such as a Bluetooth® interface or an IEEE 802.11 compliant wireless interface may enable the UE 800 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 800 may comprise a radio frequency identify (RFID) reader and/or writer device.

The switches 528 may couple to the DSP 502 via the input/output interface 518 to provide one mechanism for the user to provide input to the UE 800. Alternatively, one or more of the switches 528 may be coupled to a motherboard of the UE 800 and/or to components of the UE 800 via a different path (e.g., not via the input/output interface 518), for example coupled to a power control circuit (power button) of the UE 800. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 800 to determine its position.

Figure 9A:
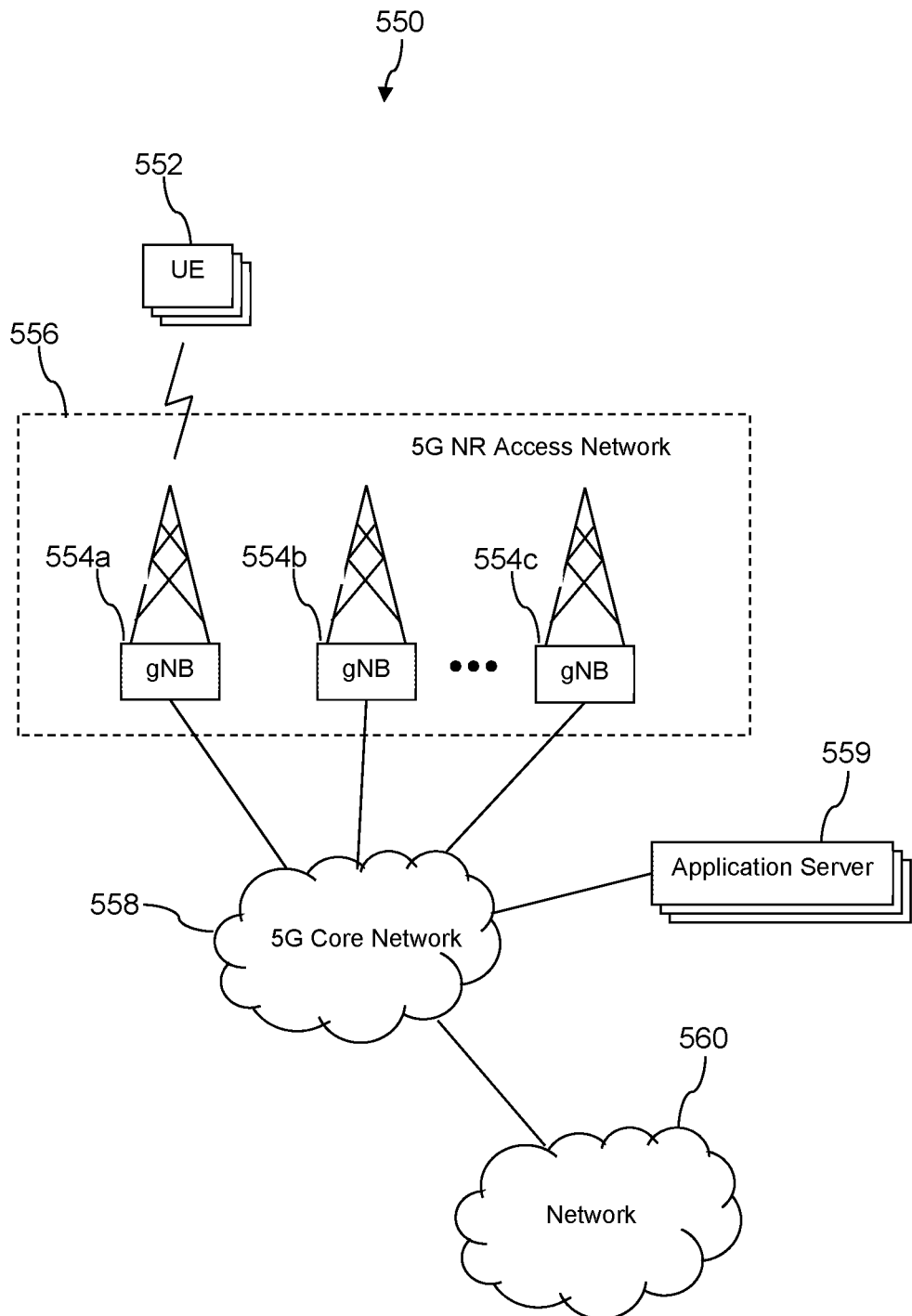
FIGS. 9A-B are block diagrams illustrating a communication system similar to the system of FIG. 1 according to an embodiment of the disclosure.

Turning now to FIG. 9A, an exemplary communication system 550 is described. In an embodiment, the communication system 550 may be implemented in the system 100 of FIG. 1. The communication system 550 includes a number of access nodes 554 that are configured to provide coverage in which UEs 552 (e.g., UEs 106A-B) such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as RAN in some contexts. In a 5G technology generation an access node 554 may be referred to as a gigabit Node B (gNB). In 4G technology (e.g., LTE technology) an access node 554 may be referred to as an eNB. In 3G technology (e.g., CDMA and GSM) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 9B:
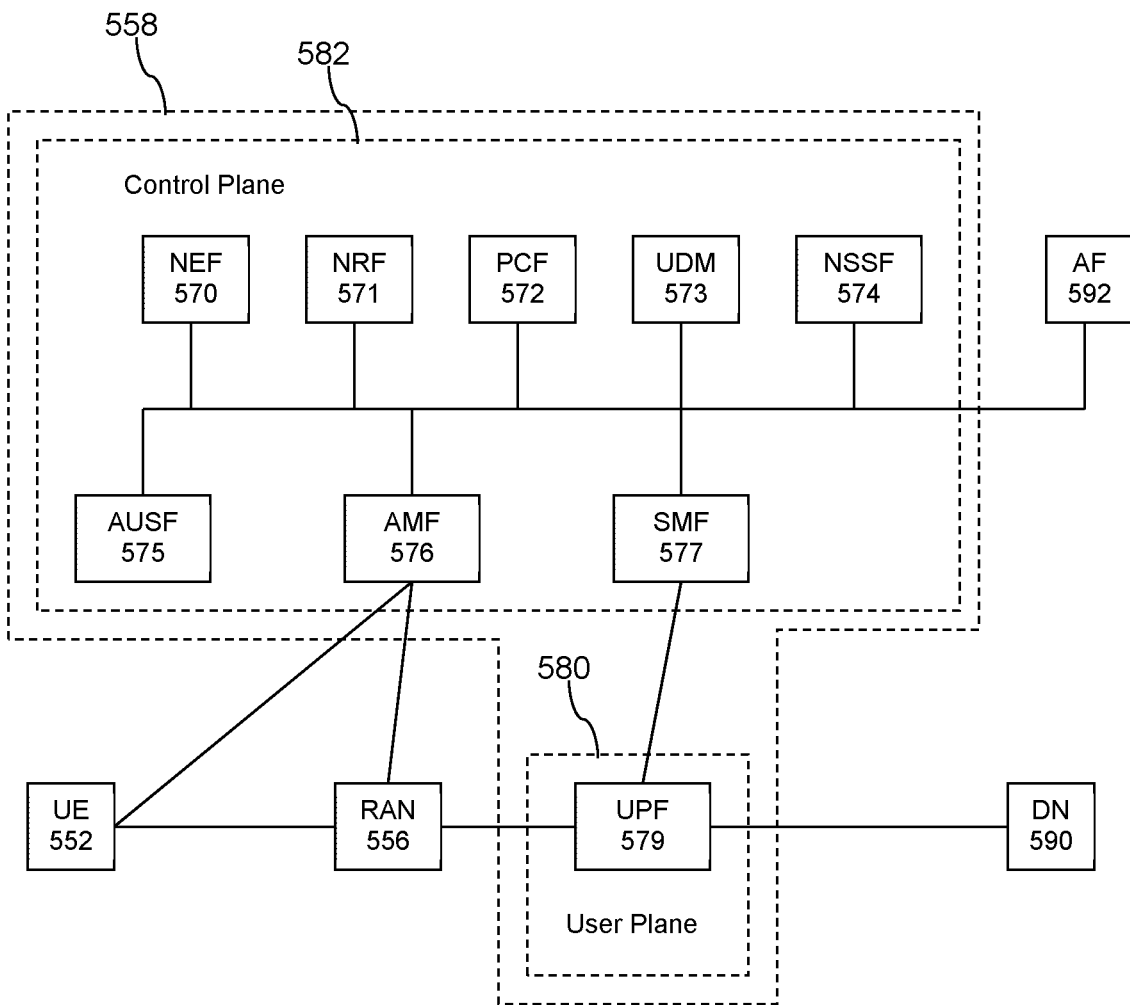

Turning now to FIG. 9B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 9A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 10:
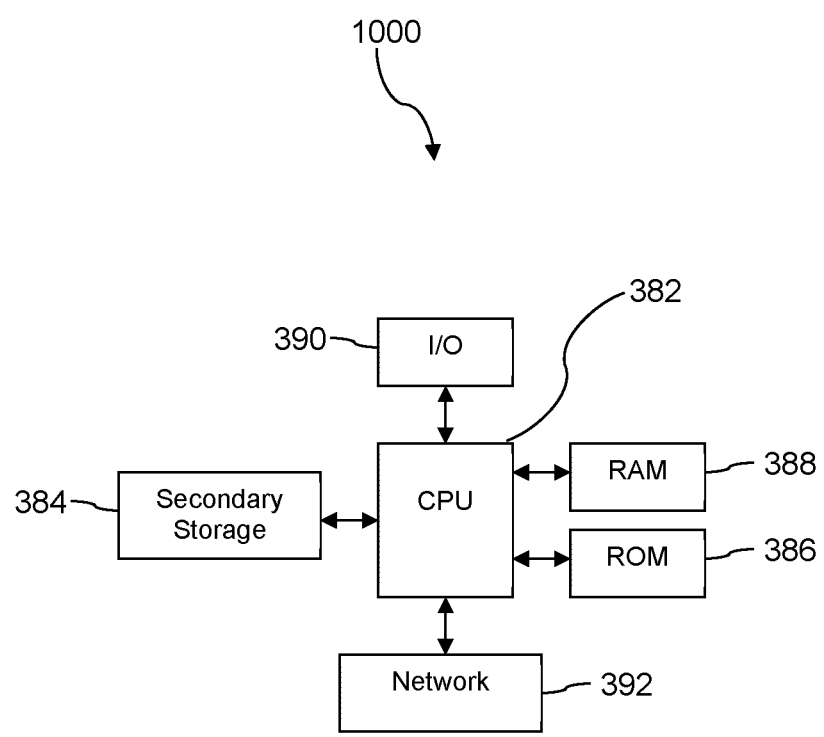
FIG. 10 is a block diagram of a computer system implemented within the system of FIG. 1 or FIGS. 9A-B according to an embodiment of the disclosure.

FIG. 10 illustrates a computer system 1000 suitable for implementing one or more embodiments disclosed herein. In an embodiment, one or more of the management server 102, storage server 104, and UEs 106A-B may be implemented as the computer system 1000. The computer system 1000 includes a processor 382 (which may be referred to as a central processor unit or CPU) that is in communication with memory devices (e.g., non-transitory memory 130) including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 1000, at least one of the CPU 382, the RAM 388, and the ROM 386 are changed, transforming the computer system 1000 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 1000 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-transitory memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), Wi-Fi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 1000 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 1000 to provide the functionality of a number of servers that is not directly bound to the number of computers in the computer system 1000. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 1000, at least portions of the contents of the computer program product to the secondary storage 384, to the ROM 386, to the RAM 388, and/or to other non-transitory, non-volatile memory, and/or volatile memory of the computer system 1000. The processor 382 may process the executable instructions and/or data structures in part by directly accessing the computer program product, for example by reading from a CD-ROM disk inserted into a disk drive peripheral of the computer system 1000. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 1000.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 1000 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

EXAMPLES

As disclosed herein, the embodiments disclosed herein keep a data inventory of the tables stored in the storage server in the form of a storage index, and the storage index stores metadata describing the tables. The management server uses the metadata in the storage index to determine duplicates or possible duplicates of columns of data, which can be used to prompt users to prevent storage of duplicate data, delete duplicate data, archive duplicate data, or even prevent migration of duplicate data.

The following examples serve to further illustrate the steps of the methods 200, 300, 400, 500, and 600. As should be appreciated, the example below serves to merely illustrate one specific implementation of the embodiments disclosed herein, but should not otherwise be interpreted to further limit the embodiments disclosed herein in any form or fashion.

In one case, MICROSOFT AZURE DATA LAKE STORAGE (ADLS) generation 2 (gen 2) may be used to manage the data stored in the storage server. First, the scanner application 118 scans and gathers metadata for all the columns and all the tables in the storage server 104:

```
query="""select STORAGE_BUCKET, TABLE_NAME,
   TABLE_LOCATION, COLUMN_NAME,
   COLUMN_DATA_TYPE from dataops_data_cata-
   log.adls_dataops_crawler_output"""
raw_df=spark.sql(query)
display(raw_df)
```

Next, the scanner application 118 logically collapses/merges all the columns into a single dataframe:

```
def simcode_df_formatting(raw_df,df_type):
   input_columns=raw_df.columns
   print(input_columns)
   compare_columns=
   ['STORAGE_BUCKET','TABLE_NAME',
      'TABLE_LOCATION','COLUMN_NAME','COL-
      UMN_DATA_TYPE']
   diff_columns=list(set(compare_columns)-set
      (input_columns))
   if not diff_columns:
      raw_df.createOrReplaceTempView('RAW TABLE')
      flattened_df=spark.sql(sim_formatting_sql)
      flattened_df=flattened_df.withColumnRenamed
         ("CONCAT_DF",df_type)
      display(flattened_df)
      return(flattened_df)
   else:
      print("Error: Some of the columns are either not
         present or are named incorrectly",diff_columns)
      return(raw_df)
```

Next, the scanner application may source dataframe and target dataframe in different variables:

```
_df=simcode_df_formatting(raw_df=raw_df,
   df_type="TARGET")
source_df=simcode_df_formatting(raw_df=raw_df,
   df_type="SOURCE")
```

Next, the scanner application 118 may pass the source and target dataframe from the above logic to the scoring applications 120 and 122 to calculate the table similarity scores 132 and the database similarity scores 134:

```
def sim_score_func(source_df,target_df):
   def matching(match_string_1):
      def matching_inner(match_string_2):
         return udf(lambda a, b: difflib.SequenceMatcher
            (a=a, b=b).ratio( ), StringType( ))(match_string_1,
            match_string_2)
      return matching_inner
   sim_df=source_df.crossJoin(target_df).withColumn
      ("SIMILARITY_SCORE", matching(source_
      df.SOURCE)(target_df.TARGET))
   return(sim_df)
// Call similarity function for each row
with tracer.span(name=f"{pipelineName}"):
   try:
      beginTime=datetime.utcnow( )
      final_df=sim_score_func(source_df, target_df)
      endTime=datetime.utcnow( )
   except Exception:
      logger. exception('ADLS similarity score function
         exception.', extra=propertiesException)
   #final_df=sim_score_func(source_df, target_df)
   display(final_df)
   // to produce the final result
   final_df=final_df.select("SIMILARITY_SCORE",
      final_df.SOURCE[0].alias('DATA-
         BASE_SEARCHED'),
      final_df.SOURCE[1].alias('TABLE_SEARCHED'),
      final_df.SOURCE[2].alias('TABLE_SEARCHED_
         PATH'),
      final_df.TARGET[0].alias('DATABASE_FOUND'),
      final_df.TARGET[1].alias('TABLE_FOUND'),
      final_df.TARGET[2].alias('TABLE_FOUND_
         PATH')).filter(concat("DATABASE_SEARCHED",
         "TABLE_SEARCHED") !=concat("DATABASE_
         FOUND", "TABLE_FOUND"))
```

The list of columns with similarities that need to be computed may be determined using the following logic:

```
CREATE OR REPLACE TEMP VIEW NEWCOLUMNS
   AS
SELECT CONCAT(column_name,column_data_type)
   AS SOURCE
FROM DATA_CATALOG.TERADATA_SIZE_DF SIZE
RIGHT JOIN DATA_CATALOG.TD_
   SIMSCORE_COLUMNMATCHES
SIM_COLUMNS
ON SIM_COLUMNS.source=CONCAT(SIZE.
   column_name,SIZE.column_data_type)
WHERE SIM_COLUMNS.source IS NULL
newcolumn_df=spark.table('NEWCOLUMNS')
all_column_df=sqlContext.sql('SELECT DISTINCT
   CONCAT(COLUMN_NAME,COLUMN_
   DATA_TYPE) AS TARGET FROM DATA_CATA-
   LOG.TERADATA_SIZE_DF')
newcolsimnames_df=sim_score_func(newcolumn_
   dtall_column_df).filter(col('SIMILARITY_
   SCORE')>0.95).selectExpr('least(SOURCE,TAR-
   GET) AS SOURCE','greatest(SOURCE,TARGET)
   AS TARGET','SIMILARITY_SCORE').dropDupli-
   cates( )
newcolsimnames_df=newcolsimnames_df.groupby
   ('SOURCE').agg(collect_list(concat(newcolsim-
   names_df.TARGET, lit(":"),
   newcolsimnames_df.SIMILARITY_SCORE)).alias
   ('COLUMN_LIKE_NAMES'))
newcolsimnames_df.createOrReplaceTempView
   ('newcolsimnames_df')
```

All the results may be stored in a table using the following logic:

```
CREATE OR REPLACE TEMP VIEW
TERADATA_SIMILAR_SCORE_NEWMETHOD
   AS
SELECT COMPLETE_DBTBL_SEARCHED.
   database_name AS DATABASE_SEARCHED,
   COMPLETE_DBTBL_FOUND.database_name AS
      DATABASE_FOUND,
   COMPLETE_DBTBL_SEARCHED.table_name AS
      TABLE_SEARCHED,
   COMPLETE_DBTBL_FOUND.table_name AS
      TABLE_FOUND,
   similarity_score AS SIMILARITY_SCORE,
   exact_match_score AS EXACT_MATCH_SCORE,
```

```
Concat(COMPLETE_DBTBL_SEARCHED.databa-
    se_name,
    COMPLETE_DBTBL_SEARCHED.table_name)
    AS DB_TBL,
S_LABFILTER.isdatalab AS SEARCHED_ISDATA-
    LAB,
F_LABFILTER.isdatalab AS FOUND_ISDATALAB,
S_LABFILTER.isview AS SEARCHED_ISVIEW,
F_LABFILTER.isview AS FOUND_ISVIEW,
CASE
WHEN
    MAIN.database_searched=MAIN.database_found
    THEN 'Within Database'
ELSE 'Outside Database'
END AS SAMEDB_FLAG,
SIM_COUNT.SEARCHED_SIMILAR_TABLES AS
    SEARCHED_SIMILAR_TABLES
FROM DATACATALOG.DBTBL_LIST COMPLET-
    E_DBTBL_SEARCHED
LEFT JOIN
(SELECT*FROM DATA_CATALOG.SIMSCORE_D-
    F_RAW_NEWMETHOD
WHERE SIMILARITY_SCORE>=0.5) MAIN ON
    MAIN.database_searched=
COMPLETE_DBTBL_SEARCHED.database_name
    AND       MAIN.table_searched=COMPLETE_
    DBTBL_SEARCHED.table_name
LEFT JOIN DATA_CATALOG.DataLab_Filter S_LAB-
    FILTER      ON         COMPLETE_DBTBL_
    SEARCHED.database_name=S_LABFILTER.
    database_name
LEFT JOIN DATA_CATALOG.DataLab_Filter F_LAB-
    FILTER
    ON     MAIN.database_found=F_LABFILTER.
    database_name
LEFT  JOIN   (SELECT  database_searched,
    database_found, COUNT(DISTINCT table_searched)
    AS
SEARCHED_SIMILAR_TABLES
    FROM       DATA_CATALOG.SIMSCORE_D-
    F_RAW_NEWMETHOD
    WHERE similarity_score>=0.5
    GROUP BY database_searched,database_found)
    SIM_COUNT
    ON          COMPLETE_DBTBL_SEARCHED.
    database_name=SIM_COUNT.database_searched
    AND MAIN.database_found=SIM_COUNT.data-
    base_found
LEFT JOIN DATA_CATALOG.DBTBL_LIST COM-
    PLETE_DBTBL_FOUND ON MAIN.database_
    found=COMPLETE_DBTBL_FOUND.database_
    name
    AND      MAIN.table_found=COMPLETE_DBTBL_
    FOUND.table_name
```

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for identifying similarities between tables and databases stored in a storage server, wherein the system comprises:
    the storage server, comprising:
        a first database configured to store a plurality of first database tables, wherein the first database tables comprise:
            a source table; and
            a target table;
        a second database configured to store a plurality of second database tables;
    a management server, comprising:
        a non-transitory memory configured to store:
            instructions; and
            a storage index indicating metadata describing a plurality of tables stored at the storage server, wherein the metadata includes table names for each of the tables, physical paths to each of the tables within the storage server, a row count of each of the tables, a size of each of the tables, a timestamp of a last access of each of the tables, access data of each of the tables, a sender of each of the tables, and a data format of each column in each of the tables;
        a processor configured to execute the instructions, which cause the processor to be configured to:
            determine, by a table similarity scoring application of the management server, a table similarity score between the source table and the target table based on a comparison between metadata describing each column in the source table and metadata describing each column in the target table;
            determine, by a database similarity scoring application of the management server, a database similarity score between the first database and the second database based on either:
                a comparison between metadata describing each column in the first database and metadata describing each column in the second database; or
                a plurality of table similarity scores between of each table in the first database and each table in the second database;
            determine, by a usage application of the management server, access data describing a frequency of accessing data stored in at least one of the first database or the source table;
            responsive to the frequency of accessing data being less than a threshold amount and the table similarity score being greater than a second threshold amount, transmit, using a server-to-storage application programming interface, an instruction to the storage server to delete data stored in the source table to eliminate redundancies at the storage server, wherein the data stored in the source table is associated with a user equipment (UE); and
            responsive to the frequency of accessing data being less than the threshold amount and the database similarity score being greater than a third threshold amount, transmit, using the server-to-storage application programming interface, an instruction to the storage server to delete data stored in the first database to eliminate redundancies at the storage server, wherein the data stored in the first database is associated with the UE.

2. The system of claim 1, wherein the instructions further cause the processor to be configured to obtain, from the storage index, the metadata describing each column in the source table and the metadata describing each column in the target table prior to determining the table similarity score and the database similarity score.

3. The system of claim 1, wherein to determine the table similarity score, the instructions further cause the processor to determine, by the table similarity scoring application, that a column in the target table matches a column in the source table to obtain a matching data column based on the comparison between the metadata describing each column in the source table and the metadata describing each column in the target table, wherein the column in the target table and the column in the source table share common metadata.

4. The system of claim 1, wherein the instructions further cause the processor to:
determine, by the table similarity scoring application, a quantity of matching columns in the source table, wherein the matching columns in the source table each share common metadata with one or more columns in the target table; and
determine, by the table similarity scoring application, a proportion of the quantity of matching columns relative to a total quantity of columns in the source table, wherein the table similarity score is the proportion.

5. The system of claim 1, wherein, to determine the database similarity score based on the comparison between the metadata describing each column in the first database and the metadata describing each column in the second database, the instructions further cause the processor to be configured to:
determine, by the database similarity scoring application, a quantity of matching columns in the first database, wherein the matching columns in the first database each share common metadata with one or more columns in the second database; and
determine, by the database similarity scoring application, a proportion of the quantity of matching columns in the first database relative to a total quantity of columns in the first database, wherein the database similarity score is the proportion.

6. The system of claim 1, wherein, to determine the database similarity score based on the table similarity scores between each table in the first database and each table in the second database, the instructions further cause the processor to be configured to:
determine, by the database similarity scoring application, a plurality of table similarity scores between each table in the first database and each table in the second database;
determine, by the database similarity scoring application, a subset of the table similarity scores that are greater than or equal to a pre-defined threshold; and
determine, by the database similarity scoring application, the database similarity score between the first database and the second database based on an average of the table similarity scores in the subset, a quantity of the table similarity scores in the subset, and a total quantity of tables in the first database.

7. A method performed by a management server for identifying similarities between tables and databases stored in a storage server, wherein the storage server comprises a source database and a target database, wherein the source database comprises a source table and a target table, and wherein the method comprises:
obtaining, by a scanner application of the management server, metadata describing each column in the source table and metadata describing each column in a target table, wherein the metadata includes table names for each of a plurality of tables stored at the storage server, physical paths to each of the plurality of tables within the storage server, a row count of each of the plurality of tables, a size of each of the tables, a timestamp of a last access of each of the plurality of tables, access data of each of the plurality of tables, a sender of each of the plurality of tables, and a data format of each column in each of the plurality of tables;
determining, by a table similarity scoring application of the management server, a table similarity score between the source table and the target table by comparing metadata describing each column in the source table with metadata describing each column in the target table;
determining, by a usage application of the management server, access data describing a frequency of accessing data stored in the source table; and
responsive to the frequency of accessing data being less than a threshold amount and the table similarity score being greater than a second threshold amount, transmitting, to a user equipment (UE), using a server-to-user equipment application programming interface, a message comprising the table similarity score and the access data, prompting a user of the UE to delete data stored in the source table to eliminate redundancies at the storage server, wherein the data stored in the source table is associated with the UE.

8. The method of claim 7, wherein determining the table similarity score comprises determining, by the table similarity scoring application, that a column in the target table matches a column in the source table to obtain a matching data column based on a comparison between the metadata describing each column in the source table and the metadata describing each column in the target table, wherein the column in the target table and the column in the source table share common metadata.

9. The method of claim 7, determining the table similarity score comprises:
determining, by the table similarity scoring application, a quantity of matching columns in the source table, wherein the matching columns in the source table each share common metadata with one or more columns in the target table; and
determining, by the table similarity scoring application, a proportion of the quantity of matching columns relative to a total quantity of columns in the source table, wherein the table similarity score is the proportion.

10. The method of claim 7, wherein comparing the metadata describing each column in the source table with the metadata describing each column in the target table comprises:
determining, by the table similarity scoring application, a string matching score based on a comparison between a metadata value for the source table and a metadata value for the target table using a string pattern matching algorithm; and determining, by the similarity scoring application, that the string matching score is greater than or equal to a pre-defined threshold; and wherein the method further comprises determining that the column in the source table is a matching column in response to determining that the string matching score is greater than or equal to the pre-defined threshold, wherein the column in the source table and the column in the target table share a common metadata value.

11. The method of claim 7, further comprising triggering the table similarity scoring application to determine the table similarity score based on a pre-defined schedule or in response to an event occurring at the storage server.

12. A method performed by a management server for identifying similarities between tables and databases stored in a storage server, wherein the storage server comprises a source database and a target database, wherein the source database comprises a source table and a target table, and wherein the method comprises:

obtaining, by a scanner application of the management server, metadata describing each column in the source table and metadata describing each column in a target table, wherein the metadata includes table names for each of a plurality of tables stored at the storage server, physical paths to each of the plurality of tables within the storage server, a row count of each of the plurality of tables, a size of each of the tables, a timestamp of a last access of each of the plurality of tables, access data of each of the plurality of tables, a sender of each of the plurality of tables, and a data format of each column in each of the plurality of tables;

determining, by a database similarity scoring application of the management server, a database similarity score between the source database and the target database by:

determining, by the database similarity scoring application, a plurality of table similarity scores between each table in the source database and each table in the target database, the table similarity scores determined based on a comparison between metadata describing columns in each table in the source database and each table in the target database;

determining, by the database similarity scoring application, a subset of the table similarity scores that are greater than or equal to a pre-defined threshold; and determining, by the database similarity scoring application, the database similarity score between the source database and the target database based on an average of the table similarity scores in the subset, a quantity of the table similarity scores in the subset, and a total quantity of tables in the source database; and determine, by a usage application of the management server, access data describing a frequency of accessing data stored in at least one of the first database or the source table;

responsive to the frequency of accessing data being less than the threshold amount and the database similarity score being greater than a third threshold amount, transmitting, to a user equipment (UE), using a server-to-user equipment application programming interface, a message comprising the database similarity score and the access data, prompting a user of the UE to delete data stored in the source database to eliminate redundancies at the storage server, wherein the data stored in the source database is associated with the UE.

13. The method of claim 12, wherein determining the table similarity score comprises comparing column names between the tables in the source database and the tables in the target database based on a comparison between the metadata of the tables in the source database and the tables in the target database.

14. The method of claim 12, determining the table similarity score comprises:

determining for each table in the source database and table in the target database a quantity of matching columns in the table in the source database, wherein the matching columns in the table in the source database each share common metadata with one or more columns in the table in the target database; and determining a proportion of the quantity of matching columns relative to a total quantity of columns in the table in the source database, wherein the table similarity score is the proportion.

15. The method of claim 12, further comprising comparing the metadata describing each table in the source database with the metadata describing each table in the target database comprises:

determining a string matching score based on a comparison between a metadata value for the table in the source database and a metadata value for the table in the target database using a string pattern matching algorithm; and determining that the string matching score is greater than or equal to a pre-defined threshold; and determining that a column in the table in the source database is a matching column in response to determining that the string matching score is greater than or equal to the pre-defined threshold, wherein the column in the table in the source database and the column in the table in the target database share a common metadata value.

16. The method of claim 12, further comprising triggering the database similarity scoring application to determine the database similarity score based on a pre-defined schedule or in response to an event occurring at the storage server.

* * * * *